(12) United States Patent
Gardner et al.

(10) Patent No.: US 9,942,105 B2
(45) Date of Patent: *Apr. 10, 2018

(54) ANIMATED GLOBE SHOWING REAL-TIME WEB USER PERFORMANCE MEASUREMENTS

(71) Applicant: SOASTA, Inc., Mountain View, CA (US)

(72) Inventors: Kenneth C. Gardner, Palo Alto, CA (US); Daniel J. Bartow, San Diego, CA (US); Darrell Esau, Santa Clara, CA (US); Tal Broda, Los Altos Hills, CA (US); Michael Hemmert, Scotts Valley, CA (US); Wilson Stockman, London (GB); Kendall Cosby, Aurora, CO (US); Cliff Crocker, Denver, CO (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/247,682

(22) Filed: Aug. 25, 2016

(65) Prior Publication Data

US 2016/0366029 A1 Dec. 15, 2016

Related U.S. Application Data

(60) Division of application No. 14/043,791, filed on Oct. 1, 2013, now Pat. No. 9,450,834, which is a (Continued)

(51) Int. Cl.
*G06F 17/22* (2006.01)
*H04L 12/24* (2006.01)
(Continued)

(52) U.S. Cl.
CPC .......... *H04L 41/22* (2013.01); *G06F 3/04815* (2013.01); *G06F 3/04845* (2013.01);
(Continued)

(58) Field of Classification Search
CPC ............. G06F 11/3495; G06F 11/3409; G06F 2201/875; G06F 3/04815; G06F 11/323;
(Continued)

(56) References Cited

U.S. PATENT DOCUMENTS 7,165,105 B2 * 1/2007 Reiner .................... G06F 11/32
707/999.007
7,383,334 B2 * 6/2008 Wong .................. G06F 17/3089
370/229

(Continued)

*Primary Examiner* — Maikhanh Nguyen
(74) *Attorney, Agent, or Firm* — The Law Offices of Bradley J. Bereznak

(57) ABSTRACT

A method includes providing a graphical user interface (GUI) that displays a view of the globe as from outer space. The view including a geographic distribution of beacons having one or more visual attributes. Each beacon corresponds to one or more real users who are accessing a website, web application or mobile app from a geographic location. The visual attributes include an indicator of a performance metric representative of an experience of the one or more real users of the website, web application, or mobile app. Each beacon is generated in real-time from aggregated data obtained in real-time from one or more corresponding real user sessions on the website, web application or mobile app. The beacons are periodically refreshed with the visual attributes changing in response to measured changes in the geographic distribution, a total number of real users at the location, or the performance indicator at the location.

14 Claims, 18 Drawing Sheets

Related U.S. Application Data continuation-in-part of application No. 13/830,850, filed on Mar. 14, 2013, now Pat. No. 9,021,362, which is a continuation-in-part of application No. 12/804,338, filed on Jul. 19, 2010, now Pat. No. 9,436,579.

(51) Int. Cl.
| | |
|---|---|
| *H04L 12/26* | (2006.01) |
| *G06F 11/34* | (2006.01) |
| *G06F 3/0481* | (2013.01) |
| *G06F 11/32* | (2006.01) |
| *G06F 3/0484* | (2013.01) |
| *G06T 13/20* | (2011.01) |
| *H04L 29/08* | (2006.01) |

(52) U.S. Cl.
CPC ........ *G06F 11/323* (2013.01); *G06F 11/3409* (2013.01); *G06F 11/3495* (2013.01); *H04L 43/045* (2013.01); *H04L 43/50* (2013.01); *G06F 2201/875* (2013.01); *G06T 13/20* (2013.01); *H04L 41/5038* (2013.01); *H04L 43/06* (2013.01); *H04L 43/12* (2013.01); *H04L 67/02* (2013.01); *H04L 67/22* (2013.01)

(58) Field of Classification Search
CPC ............. G06F 11/3414; G06F 11/3419; G06F 11/3452; G06F 11/3457; H04L 41/22; H04L 43/045; H04L 43/06; H04L 43/50; H04L 41/5038; H04L 43/12; H04L 43/08; H04L 43/10; H04L 43/0876; H04L 67/02
See application file for complete search history.

(56) References Cited

U.S. PATENT DOCUMENTS

| | | | | |
|---|---|---|---|---|
| 7,752,261 | B1* | 7/2010 | Nalam | G06F 15/16 709/203 |
| 7,965,643 | B1 | 6/2011 | Gilbert et al. | |
| 8,041,303 | B2* | 10/2011 | Jiang | H04L 41/5009 370/252 |
| 8,188,921 | B2* | 5/2012 | Marks | G01S 5/0226 342/451 |
| 8,274,905 | B2* | 9/2012 | Edwards | H04L 12/66 370/252 |
| 8,365,150 | B2* | 1/2013 | Wong | G06Q 30/02 709/202 |
| 8,462,049 | B2* | 6/2013 | Marks | G01S 5/0236 342/451 |
| 8,825,749 | B2* | 9/2014 | Tully | H04N 21/251 709/203 |
| 9,384,121 | B2 | 7/2016 | Jackson et al. | |
| 9,430,746 | B2* | 8/2016 | Pecjak | H04L 67/02 |
| 9,436,579 | B2 | 9/2016 | Broda et al. | |
| 9,450,834 | B2 | 9/2016 | Gardner et al. | |
| 9,491,248 | B2 | 11/2016 | Broda et al. | |
| 9,495,473 | B2 | 11/2016 | Gardner et al. | |
| 9,720,569 | B2 | 8/2017 | Gardner et al. | |
| 2002/0107826 | A1 | 8/2002 | Ramachandran et al. | |
| 2002/0177910 | A1* | 11/2002 | Quarterman | G05B 13/042 700/28 |
| 2003/0023715 | A1* | 1/2003 | Reiner | G06F 11/32 709/224 |
| 2003/0130982 | A1 | 7/2003 | Kasriel et al. | |
| 2005/0027858 | A1 | 2/2005 | Sloth et al. | |
| 2007/0011304 | A1* | 1/2007 | Error | G06Q 30/02 709/224 |
| 2007/0143306 | A1* | 6/2007 | Yang | G06F 17/3089 |
| 2007/0288205 | A1 | 12/2007 | Vazquez et al. | |
| 2008/0049641 | A1 | 2/2008 | Edwards et al. | |
| 2008/0140347 | A1 | 6/2008 | Ramsey et al. | |
| 2008/0146160 | A1* | 6/2008 | Jiang | H04L 41/5009 455/67.11 |
| 2008/0189408 | A1* | 8/2008 | Cancel | G06Q 10/04 709/224 |
| 2008/0235075 | A1 | 9/2008 | Couture et al. | |
| 2009/0077107 | A1* | 3/2009 | Scumniotales | G06Q 10/0637 |
| 2009/0210890 | A1* | 8/2009 | Tully | G06F 17/3089 719/331 |
| 2010/0023867 | A1* | 1/2010 | Coldiron | H04L 41/22 715/736 |
| 2010/0115496 | A1* | 5/2010 | Amichai | G06F 11/3612 717/135 |
| 2010/0251128 | A1* | 9/2010 | Cordasco | G06F 11/328 715/736 |
| 2010/0332401 | A1 | 12/2010 | Prahlad et al. | |
| 2011/0066591 | A1 | 3/2011 | Moyne et al. | |
| 2011/0068981 | A1* | 3/2011 | Marks | G01S 5/0226 342/451 |
| 2011/0191465 | A1 | 8/2011 | Hofstaedter et al. | |
| 2011/0096108 | A1 | 12/2011 | Agrawal et al. | |
| 2012/0324101 | A1* | 12/2012 | Pecjack | H04L 67/02 709/224 |
| 2013/0166634 | A1 | 6/2013 | Holland | |
| 2015/0095471 | A1 | 4/2015 | Singh et al. | |

\* cited by examiner

| Number Of Pages In Session | Page Load Time | Total Load Time | Total Time Spent | Custom Metrics | Average Load Time |
|---|---|---|---|---|---|
| 1 | 3s | 3s | 30s | 0 | 3s |
| 2 | 1s | 4s | 60s | 0 | 2s |
| 3 | 2s | 6s | 80s | 0 | 2s |
| 4 | 1.5s | 7.5s | 120s | 3 | 1.875s |
| 5 | 4s | 11.5s | 170s | 3 | 2.3s |

FIG. 10

120 {
- Geography
- Country and Region
- Browser Type
- O/S
- Page Group
- Alpha/Beta Test
- Bandwidth
- Customer Defined Metrics 121 {
→ Country
→ Page Group
→ Country and Page Group
→ Country and Browser
→ Country and Region (If USA)

FIG. 12

B1: USA, CA, Chrome, Homepage
- ↳ USA
- ↳ USA and CA
- ↳ Home
- ↳ USA and Chrome B2: USA, MA, Internet Explorer, Home
- ↳ USA
- ↳ USA and MA
- ↳ Home
- ↳ USA and Internet Explorer

FIG. 13

ANIMATED GLOBE SHOWING REAL-TIME WEB USER PERFORMANCE MEASUREMENTS

RELATED APPLICATIONS

This is a divisional application of Ser. No. 14/043,791 filed Oct. 1, 2013, now U.S. Pat. No. 9,450,834 B2, which is a continuation-in-part (CIP) application of application Ser. No. 13/830,850 filed Mar. 15, 2013, now U.S. Pat. No. 9,021,362 B2, entitled, "REAL-TIME ANALYTICS OF WEB PERFORMANCE USING ACTUAL USER MEASUREMENTS", which is a CIP of application of Ser. No. 12/804,338 filed Jul. 19, 2010, now U.S. Pat. No. 9,436,879 B2, entitled, "REAL-TIME, MULTI-TIER, LOAD TEST RESULTS AGGREGATION" each of which are assigned to the assignee of the present application.

TECHNICAL FIELD

The present disclosure relates generally to cloud computing; more particularly, to automated systems and methods for functional and/or load testing of websites, as well as to capturing and analyzing real-time information of actual user experience on websites and using web-based applications.

BACKGROUND

Information technology is now routinely used by many enterprises to receive, process, and provide information via widely accessible electronic communications networks, such as the Internet. Yet most information technology systems will begin to deny service, or fail to process message traffic efficiently, when communications traffic exceeds a processing capacity of the system. Such failures in communication can significantly impair the operations of an enterprise in many ways. Slower website performance is also known to cause users/visitors to leave the website sooner. Another consequence of poor performance is that the website may be downgraded in search engine results rankings.

In recent years, enterprises and developers have sought an easy and affordable way to use cloud computing as a way to load and performance test their web-based applications. Cloud computing gets its name from the fact that the machine, storage, and application resources exist on a "cloud" of servers. In cloud computing shared resources, software and information are provided on-demand, like a public utility, via the Internet. Cloud computing is closely related to grid computing, which refers to the concept of interconnecting networked computers such that processing power, memory and data storage are all community resources that authorized users can utilize for specific tasks.

Load testing a web-based application or website can involve simulating a very large number (e.g., up to or beyond 1,000,000) of virtual website users via Hypertext Transfer Protocol (HTTP) or HTTP Secure (HTTPS) message intercommunications with the target website. For very large tests, sending and aggregating the test results data generated from all of the load servers to a database available to a dashboard in real-time has been problematic. The huge overhead of receiving and processing a very large number of HTTP messages containing all of the requests and responses sent from each of the many load servers to the analytic servers responsible for analyzing the test results data can easily overwhelm the resources of the server.

Enterprises are also interested in real user measurement (RUM) data analysis that captures and collects data about present, real user experiences when actual users visit and use a website or web application. Traditional analytical tools have been able to provide data analysis solutions that collect data about past events, it has been problematic to deliver real-time business intelligence information based on actual mobile and desktop user experience as it occurs in the present. That is, traditional solutions have not been able to test, monitor, and measure real user behavior to gain the analytics and intelligence needed to capture performance metrics such as bandwidth and web page load time, as well as correlate the impact of such metrics on the behavior of users as it relates to the business' bottom line.

BRIEF DESCRIPTION OF THE DRAWINGS

The present disclosure will be understood more fully from the detailed description that follows and from the accompanying drawings, which however, should not be taken to limit the invention to the specific embodiments shown, but are for explanation and understanding only.

FIG. 10 is a table showing various data and performance metrics collected from an example user session.

FIG. 12 is an example list of selected metrics, and combinations of metrics, that may be of interest for template expansion.

FIG. 13 illustrates a user session with an example template expansion based on a limited set of different combinations of metrics.

DETAILED DESCRIPTION

Figure 1:
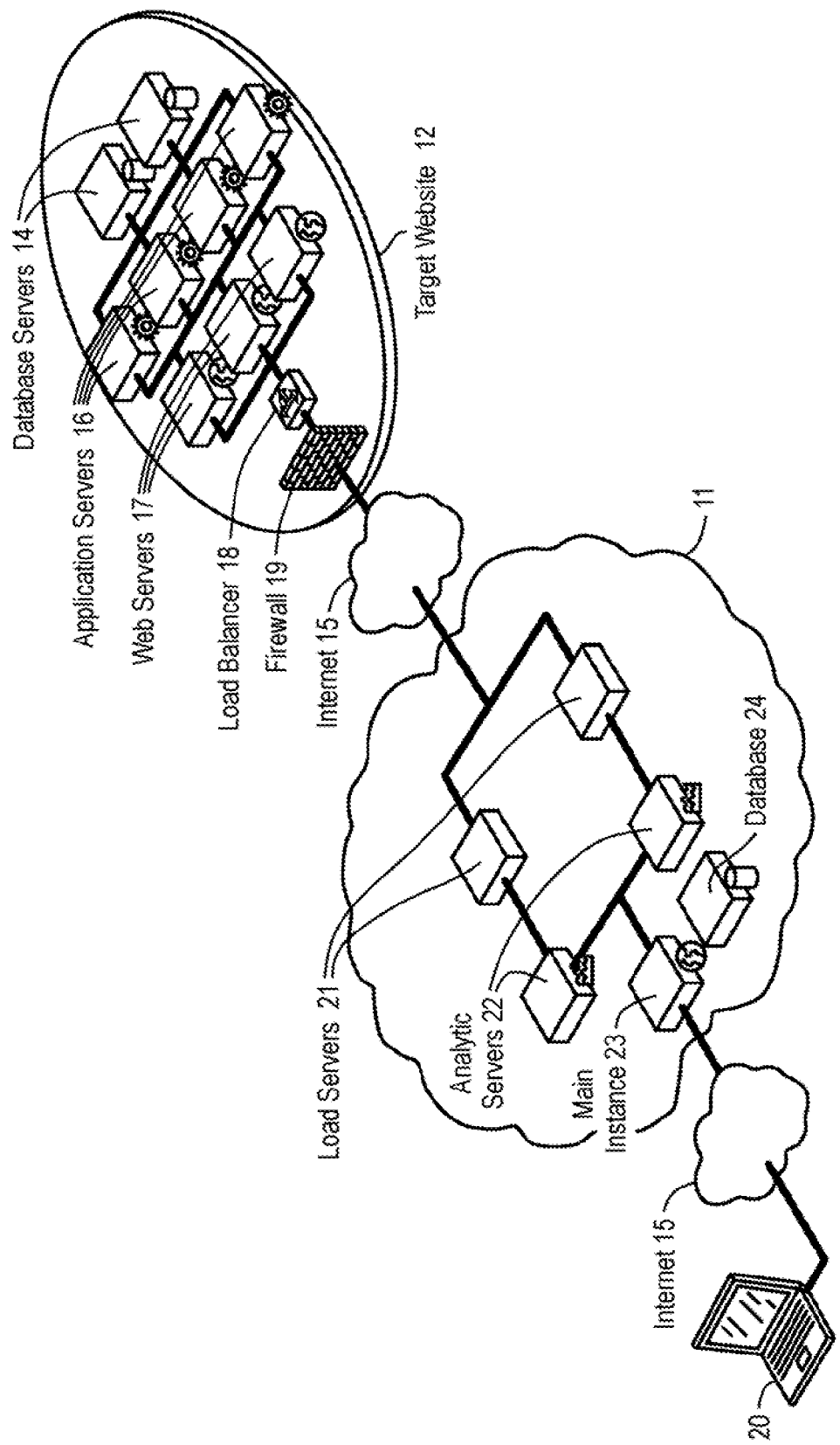
FIG. 1 illustrates an example high level architectural diagram of one stage of a provisioning process.

In the following description specific details are set forth, such as server types, cloud providers, structural features, process steps, user interfaces, etc., in order to provide a thorough understanding of the subject matter disclosed herein. However, persons having ordinary skill in the relevant arts will appreciate that these specific details may not be needed to practice the present invention. It should also be understood that the elements in the FIG.s are representational, and are not necessarily drawn to scale in the interest of clarity.

References throughout this description to "one embodiment", "an embodiment", "one example" or "an example" means that a particular feature, structure or characteristic described in connection with the embodiment or example is included in at least one embodiment. The phrases "in one embodiment", "in an embodiment", "one example" or "an example" in various places throughout this description are not necessarily all referring to the same embodiment or example. Furthermore, the particular features, structures or characteristics may be combined in any suitable combinations and/or sub-combinations in one or more embodiments or examples.

In the context of the present application, the term "cloud" broadly refers to a collection of machine instances, storage and/or network devices that work together in concert. A "public cloud" refers to a cloud that is publically available, i.e., provided by a cloud provider that a user may access via the Internet in order to allocate cloud resources for the purpose of utilizing or deploying software programs, and also for running or executing those programs thereon. Some public clouds deliver cloud infrastructure services or Infrastructure as a Service (IaaS). By way of example, Amazon Elastic Compute Cloud (also known as "EC2™") is a web service that allows users to rent computers on which to run their own computer applications, thereby allowing scalable deployment of applications through which a user can create a virtual machine (commonly known as an "instance") containing any software desired. The term "elastic" refers to the fact that user can create, launch, and terminate server instances as needed, paying by the hour for active servers.

Cloud platform services or "Platform as a Service (PaaS)" deliver a computing platform and/or solution stack as a service. An example PaaS cloud provider is the Google App Engine, which lets anyone build applications on Google's scalable infrastructure. Another leading software platform in the cloud provider is Microsoft Azure™, an application platform in the cloud that allows applications to be hosted and run at Microsoft datacenters. A "private cloud" is a cloud that is not generally available to the public, and which is typically located behind a firewall of a business. Thus, a private cloud is only available as a platform for users of that business who are behind the firewall.

The term "cloud computing" refers to a paradigm in which machine, storage, and application resources exist on a "cloud" of servers. In cloud computing shared resources, software and information are provided on-demand, like a public utility, via the Internet. Thus, cloud computing provides computation, data access, and storage resources without requiring users to know the location and other physical details of the computing infrastructure. Cloud computing is closely related to grid computing, which refers to the concept of interconnecting networked computers such that processing power, memory and data storage are all community resources that authorized users can utilize for specific tasks.

The term "server" broadly refers to any combination of hardware or software embodied in a computer (i.e., a machine "instance") designed to provide services to client devices or processes. A server therefore can refer to a computer that runs a server operating system from computer-executable code stored in a memory, and which is provided to the user as virtualized or non-virtualized server, it can also refer to any software or dedicated hardware capable of providing computing services.

In the context of the present disclosure, "load" servers (also referred to as "Maestro" or "test" servers) are servers deployed and utilized primarily to generate a test load on a target website. That is, load servers play the test composition, generating a load on a target (customer) website and web applications. Load servers also function to report back results of the load test and statistics in real-time. "Analytic" or "result" servers are deployed and utilized primarily to collect the real-time test results from the load servers, aggregate those results, stream the results to real-time dashboards, and store them in a database.

Similarly, "collector" servers are servers deployed and used to receive real-user measurement data sent from a user's client device. Each of the collectors process and aggregate the data items received. "Consolidators" are servers deployed and utilized in a hierarchical manner to accumulate and aggregate the data received from the collectors. The consolidators are typically configured to stream the further aggregated data to a ResultService Reader/Writer unit that stores a final aggregated set or array of data results in a database accessible to a computer or main instance that generates an analytic dashboard in real-time from the final aggregated set or array of data results.

The term "real-time" refers to a level of computer responsiveness that a user senses as sufficiently immediate or that enables the computer to keep up with some external process (for example, to present visualizations of load test results as it constantly changes). Thus, real-time is a mode of computer operation in which the computer collects data, analyzes or computes with the data, reports (e.g., visually displays) and/or stores the results nearly simultaneously, i.e., within seconds or milliseconds.

A "grid" or "test grid" refers to a collection of interconnected servers that may be used to run a load test on a target website, or to perform RUM of a website or deployed application to provide a real-time view of actual user activity. As disclosed herein, a computer program or grid wizard may be utilized to automatically determine the global, cross-cloud, resources needed to execute a test or measurement. Furthermore, the computer program can automatically allocate those server resources required for the test or measurement across multiple different cloud providers; verifies that the allocated servers are operational; and that the allocated servers are running the proprietary software or computer program product correctly. The computer program or product also monitors the allocated servers, replacing non-operational servers (when allocated, and during execution of the test or measurements) and displays results from multiple globally distributed clouds in a real-time streaming dashboard which requires no user initiated refresh.

In the context of the present disclosure, the term "beacon" refers to data related to a user" experience on a particular website or web application, collected by a library (e.g., a JavaScript library) running on the browser of a client device, and sent via Hypertext Transfer (or Transport) Protocol (HTTP) to a server. The server receiving the beacon information may aggregate that data along with similar data received from other users accessing the same website or web application. Any HTTP headers sent by the browser as part of the HTTP protocol may also be considered part of the beacon. A beacon may therefore be thought of as a page view on a website, but without a corresponding page. For every user who visits that website, the browser running the library on the user's client device measures various metrics and records data that is then sent or "beaconed" back to a results server in real-time as the user navigates through or uses the website.

A "data bucket" or "bucket" refers to a type of data buffer, data container, block of memory, or file on a disk that contains data. In the present disclosure, data buckets are arranged in a set or array, with each data bucket containing a count of a number of data values falling within a predetermined range. A given data bucket may be empty, or non-empty. The set or array of data buckets are typically arranged in an ascending order such that all of the data buckets span a full range of data values expected to be received for a particular data set or data type, e.g., from the lowest data value to the highest data value. Each of the data buckets are defined with predetermined value ranges such that a received data value will fall within a single one of the data buckets in the set or array.

In one embodiment, a method and system is provided for calculating load test aggregated test results at three architectural levels: first, at the load server level; second, at the analytics server level; and lastly at the system-wide datastore level. In a specific implementation, detailed level "raw" data (the content of a request sent to a website e.g., to access a homepage) is not sent from any of the load servers to any analytic server. Thus, system resources on the load server side are not wasted for the continual sending of raw data. Similarly, system resources on the analytics server side are conserved since the need to receive and process raw data sent from the load servers is obviated.

Instead of sending the raw data (web pages' responses and their statistics) obtained during a load test from each of the load servers to the analytic servers, a level of aggregation is added within each of the load servers. That is, in one embodiment, each load server includes an embedded component or client (referred to as a Results Service Client) that performs analytics server functions at the load server level. This Results Service Client aggregates test result data and generates various results statistics or metrics, e.g., average response time, average response size, etc., from the raw data that the load server received from the target website or application. The statistics computed by the Results Service Client in each of the load servers are then sent to their associated analytic server at periodic intervals (e.g., once every five seconds).

In another embodiment, a grid of servers is deployed to collect and process real-user measurements that capture actual mobile and desktop user experience on a website or web application. A beacon of data received from a plurality of client devices associated with users visiting or accessing a particular website or web application is aggregated in a multi-tiered architecture of servers that collect and consolidate measurements in identical sets or arrays of data buckets. In one embodiment, the width or range of each data bucket used for collecting data received and aggregated from the user beacons is set to be equal, bucket-to-bucket. In another embodiment, each of the data buckets is assigned a predetermined variable-width or range. Visualized data analytics for display in a real-time analytic dashboard are generated from the collection and consolidation of real-user measurements.

FIG. 1 illustrates an example high level architectural diagram of one stage of a CloudTest® provisioning process, which is the name given to the application program or grid wizard program described herein. As shown, a target website 12 includes a plurality of web servers 17 coupled to Internet cloud 15 through a load balancer 18 and a firewall 19. Web servers 17 are interconnected with a plurality of application servers 16 and a plurality of database servers 14.

Target website 12 is shown connected to a public cloud 11 via Internet cloud 15a. Public cloud 11 includes a main instance 23 coupled to a database 24. Database 24 may be used to store test results, store metadata indicative of the test definition, and to store monitoring data (e.g., CPU metrics) generated during the load test. Main instance 23 is also shown coupled to a pair of analytic servers 22 and a pair of load servers 21 within cloud 11, consistent with a snapshot view of the start of a process of deploying a test grid. It is appreciated that cloud 11 may comprise multiple clouds associated with multiple different cloud providers. In the example shown, main instance 23 is a virtual machine deployed on a server provided in cloud 11 that communicates with a browser application. In one embodiment, main instance 23 may include a results service (designated as a "reader" results service, as opposed to all of the other remote, "writer" results services) which reads data from database 24 and serves it to a web application, which in turn formats the data and serves it to an analytic dashboard in the browser. In operation, main instance 23 executes the coded sequence of computer executed steps (e.g., from code stored in a memory) that allocates the server resources required for the test across one or multiple different cloud providers. The same application that allocates/verifies server resources may also verify that the allocated servers are operational to conduct the website load test. The main instance may also execute code that implements the multi-tiered load test results aggregation steps disclosed herein.

Connected to the front-end of cloud 11 through Internet cloud 15 is a laptop computer 20 associated with a user who may orchestrate deployment of the test of target website 12. It is appreciated that in other implementations, computer 20 may comprise a desktop computer, workstation, or other computing device that provides a user interface that allows a user to create and execute the test composition, define the parameters of the grid, initiate the load test, as well as analyze/review results of the test in real-time. The user interface may be web-based so it can be accessed from any computer having web-browser capabilities from any location in the world, without installation of specialized software.

Persons of skill in the art will understand that the software which implements main instance 23 may also be downloaded to the user's laptop computer 20 or implemented on a separate hardware appliance unit located either at the user's premises (e.g., behind the firewall) or anywhere in clouds 15 or 11. It is further appreciated that laptop 20 is representative of a wide variety of computer devices, such as workstations, personal computers, distributed computer systems, etc., that may be utilized by the user to launch the method for provisioning/running the cross-CloudTest grid, analyzing streaming real-time results, as well as monitoring the performance of the actual load test.

Continuing with the example of FIG. 1, the application program running on main instance 23 operates to create a graphical user interface (GUI) that allows a user of laptop 20 to remotely interact with the application, view/monitor the test results in real-time, and modify parameters/test conditions dynamically during the actual test. (For purposes of the present disclosure, the grid wizard is considered synonymous with the application program or system program that performs the method and operations described herein.) In one embodiment, main instance 23 may include an embedded load server for running a relatively small load test that does not require the deployment of other load servers, and an embedded results (i.e., analytic) server for collecting/aggregating the real-time test results. In another embodiment, the main instance and the database provide a basic CloudTest environment that can be used to launch/establish one or more grids, with more or more cloud providers being utilized to provision each grid.

The overall testing process begins with the user creating a sophisticated test plan or composition via a GUI of either the same application program running on main instance 23 or a GUI associated with another web browser application. The GUI may be utilized that generate complex parallel message streams for website testing. In one example, the test plan may be created in the form of a visual message composition (analogous to a music composition) for testing and demonstrating web services, such as that described in U.S. patent application Ser. No. 11/503,580, filed Aug. 14, 2006, which application is herein incorporated by reference.

The process of deploying the test grid for a large-scale test may start with the user of laptop 20 indicating to main instance 23 the number of virtual users wanted on each track of the test composition. For example, the user of the system may wish test the target website with a load equal to 1000 users on each track of a test composition. The user may indicate the number of virtual users through an input entered on a browser page of the GUI (as described below), or, alternatively, invoke a grid wizard that automatically makes an intelligent allocation of the proper amount of resources needed to conduct the test, based on examining the composition that this grid will be running. By way of example, the system may determine that a single load server should be allocated to accommodate every 1000 virtual users.

Similarly, the system (via a grid wizard) may determine a proper allocation of result servers needed to accommodate the number of load servers specified. In one embodiment, users can specify how many load servers and how many result servers they want in each cloud and region. Alternatively, users may employ the grid wizard to specify all parameters. That is, users can simply specify a defined test composition, and the grid wizard automatically analyzes the composition and determines how many servers they need in each cloud and region. It is appreciated that the determination of the number of load servers and result servers is typically made based on considerations that ensure each virtual user has a satisfactory amount of bandwidth, CPU & memory resources, etc., such that it correctly simulates or behaves as a real-world browser.

Once the test has been defined and the parameters set (e.g., number of servers, server locations, etc.) via the grid wizard, upon user input, the user main instance 23 starts the process of actually deploying and allocating the specified resources by interacting with an application programming interface (API) of one or more cloud providers. By way of example, a user may click on a "Deploy Instances" button provided in a page of the CloudTest program GUI; in response, the system software contacts all of the different cloud APIs it needs and starts to allocate the required servers.

For example, if 1000 servers are to be allocated in EC2 there may be 40 simultaneous requests issued, each request being for 25 servers. If another 200 servers need to be allocated in Microsoft Azure in two different geographically-located data centers, two simultaneous requests may be issued, each for 100 servers in each data center (due to the fact that Azure does not support allocating smaller groups into one single deployment). In other words, the user may simply click on an icon button of a GUI to initiate the deployment/allocation of resources (e.g., machine instances) needed to execute the test composition, with the requests necessary to achieve that allocation being issued/handled in an automated manner, i.e., without user intervention.

FIG. 1 show the beginning of this process, wherein a first pair of load servers 21 and analytic servers 22 (also referred to as result servers or results services) have already been allocated and deployed on the grid.

Figure 2:
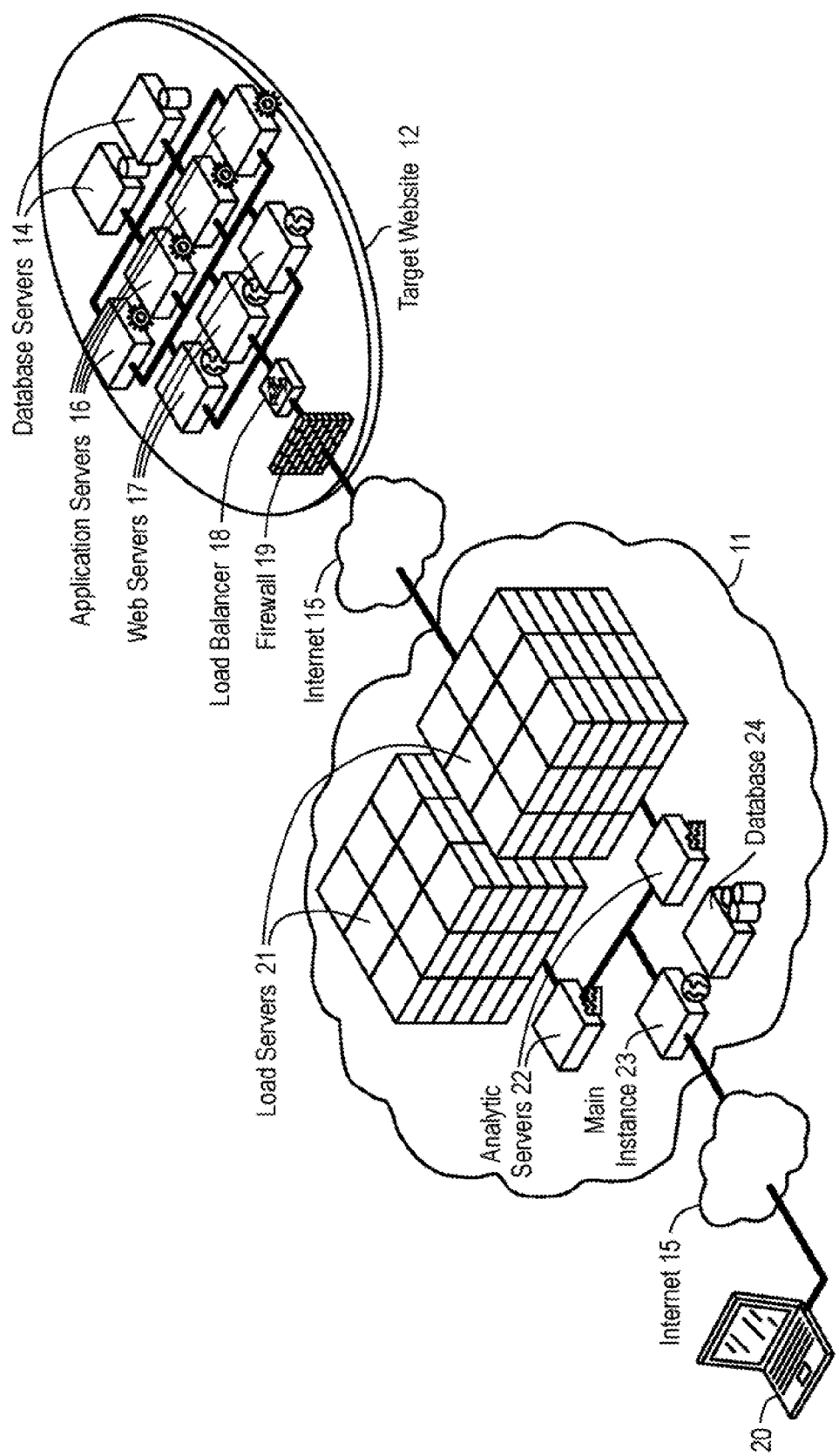
FIG. 2 illustrates an example high level architectural diagram of another stage of a provisioning process after the cross-cloud grid has been fully allocated and checked.

FIG. 2 illustrates an example high level architectural diagram of a later stage of a CloudTest test grid provisioning process, which may be after the cross-cloud grid has been fully allocated and checked. For reasons of clarity, an array of just fifty-four interconnected load servers 21 are shown allocated per each result server 22 in the example of FIG. 2. It is appreciated, however, that the system and method described herein is highly scalable and capable of deploying/allocating a massive amount of resources including hundreds or thousands of load servers as well as a corresponding portion or ratio of result servers, depending on the parameters specified by either the user or system prior to deployment of the grid. In one embodiment, a typical ratio of analytic (result) servers to load (maestro) servers is 1:50. As discussed previously, a grid—whether cross-cloud or single cloud—is a collection of load servers 21 and result servers 22, all of which (or a subset of) can be used to run a load test in concert.

Figure 3:
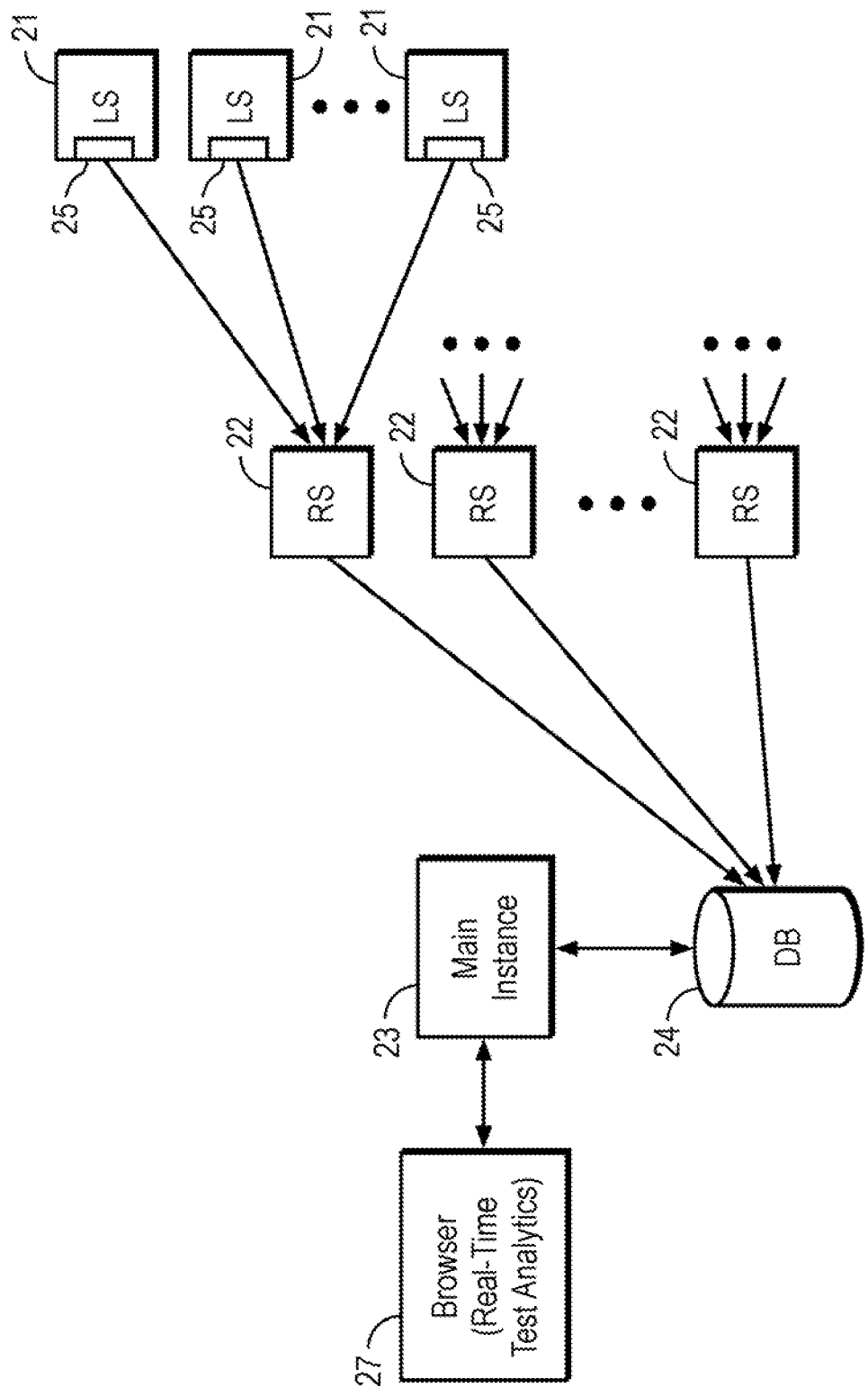
FIG. 3 is an example block high level architectural diagram that illustrates how, in real-time, load test results are aggregated at multiple different tiers or levels.

FIG. 3 is an example block high level architectural diagram that illustrates how, in real-time, load test results are aggregated at multiple different tiers or levels. As shown, block 27 represents a browser that provides real-time test analytics to a user (e.g., via laptop 20 shown in FIG. 1, or other computer device). Browser 27 is shown connected with main instance 23, which, in turn, is coupled with database 24. Database 24 provides system-level storage for aggregated test result data received from the Results Service servers 22. Database 24 receives aggregated test result data via a direct connection to each of the plurality of result servers 22.

Each of result servers 22 is connected to a plurality of associated load (Maestro) servers 21. Each load server 21 is shown having an embedded component or Result Service client 25, which computes metrics or statistics from the raw data (e.g., web pages) received from the target website or application. As discussed previously, the function of each load server 21 is to provide a load to the target website by creating one or more virtual users that access information on the target website. Within each Maestro server 21 is Result Service client 25 which functions to compute statistics such as average response time, average response size, and the like. In one embodiment, instead of sending all of the raw data received from the target website, Result Service client 25 computes relevant statistics and discards the data. Then, once an interval (e.g., every five seconds) the statistics computed by client 25 are sent to the associated result server 22.

Each of the result servers takes all of the statistics received from all of its associated load servers 21 and further aggregates those statistics. In other words, each result server 22 aggregates the aggregated results received from all of the load servers 21 that it is connected to. The resulting aggregated data is then further aggregated in database 24. Thus, statistics such as average response time across all of load servers 21 for the load test is stored in database 24 and available on a real-time basis to browser 27, via database queries performed by the main instance 23, which can perform further aggregation, grouping, filtering, etc.

Practitioners in the art will appreciate that the disclosed multi-tiered architecture does not overburden analytic servers 22 with excessive messaging of raw data. Furthermore, persons of skill will understand that aggregating statistical results data on multiple levels, beginning at the point closest to the actual load test results' creation, allows a user to view results in real-time on an analytic dashboard graphical user interface, thereby permitting real-time analysis across the entire testing infrastructure.

In a specific embodiment, each load server 21 includes an accumulator that stores the statistically aggregated data (e.g., average response or load time) computed on a second-by-second basis. Periodically (e.g., every 5 seconds), each load server 21 sends an appropriate number of messages (e.g., 5 messages, one for each second) to its associated result server 22. That is, one batched message is sent every 5 seconds—the batched message including data about all of the previous 5 seconds. Each message contains the data metrics computed every one second interval. These fine granularity metrics are then further aggregated in database 24. It is appreciated that by computing statistics/metrics on a second-by-second basis, the analytic dashboard running on browser 27 can analyze the results on various levels of granularity. In other words, the user may want to view statistical results of the load test on a minute-by-minute basis, or all the way down to a second-by-second basis. Thus, the architecture described herein allows a user to view real-time streaming results in an analytic dashboard of various performance metrics on a second-by-second basis, even when there are millions of virtual users on thousands of load servers.

Figure 4:
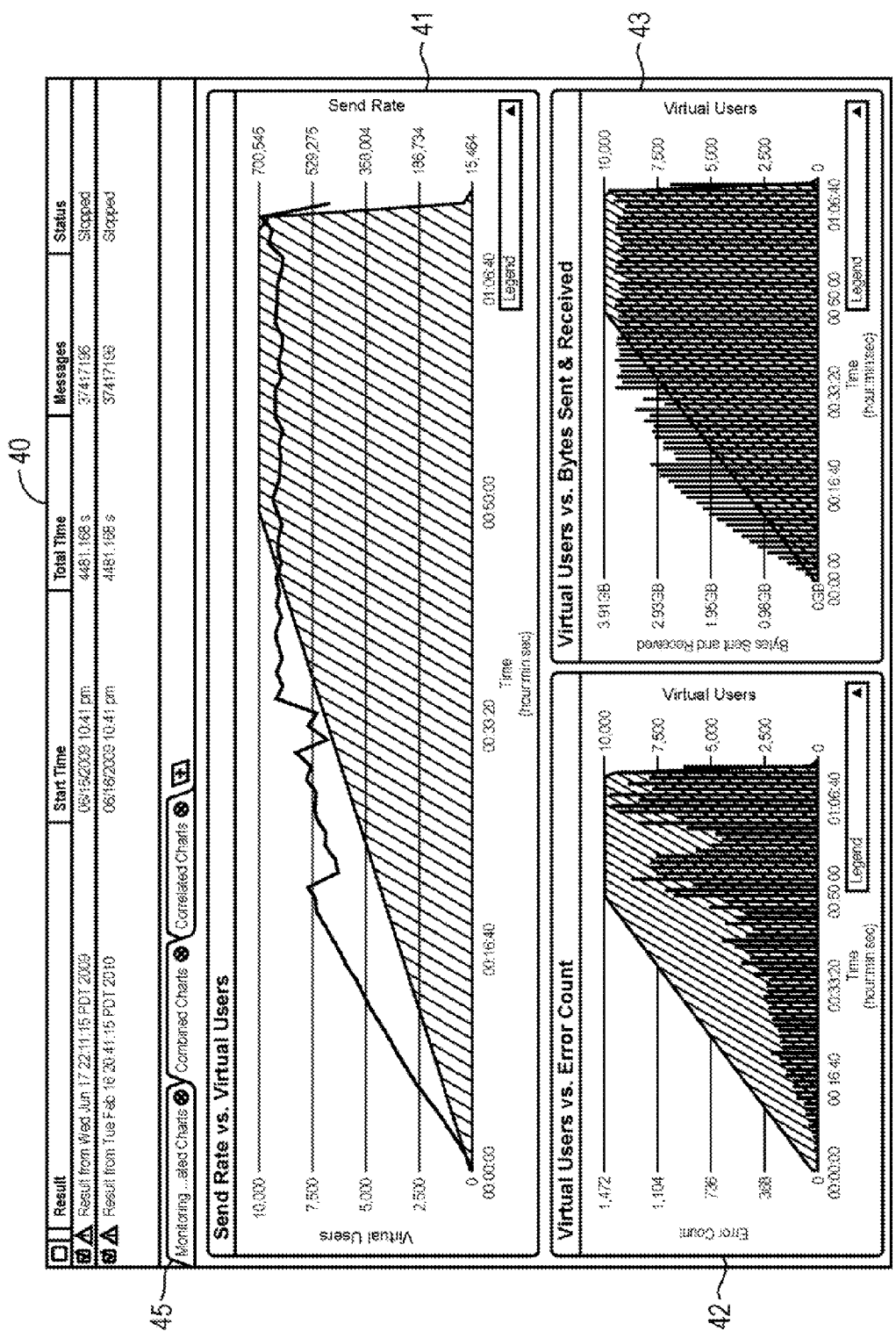
FIG. 4 illustrates an example graphical user interface window that shows real-time results of a test composition running on an example grid.

FIG. 4 illustrates an example graphical user interface window (also referred to as "widget") 40 that shows real-time results of a test composition running on an example grid. In other words, monitor summary widget 40 provides the user with visibility into the load that the test is creating on the grid server instances. (In the context of the present disclosure, a widget refers to a super class of charts—anything that a user might want to display graphically on a user interface. A widget can be a cross-set of results data, a set of charts, a list of data, or any combination/correlation of data displayed on the analytic dashboard.)

As can be seen, a set of combined charts are shown graphically in various window fields. For example, field 41 illustrates the number of virtual users (shaded area) and the send rate (heavy line) as a function of test time. Field 42 illustrates error count (vertical dark lines) and the number of virtual users (shaded area) versus test time. Field 43 shows the number of bytes sent and received (vertical dark lines) and the number of virtual users (shaded area) as a function of test time. It is appreciated that the user may select/view a wide variety of charts (combined, correlated, etc.) using tabs 45. Collectively, the charts provided in window 40 allow a user to view, analyze, and monitor test results and information in real-time so as to help identify root causes of performance problems their website or web application may be experiencing.

Persons of skill in the arts will appreciate that FIG. 4 shows how the entire test grid (comprising a huge number of interconnected load and result servers) works in concert to send load, receive responses, aggregate and analyze those responses into a real-time streaming graphical result displayed to the user. All this is accomplished regardless of how many server instances and different cloud providers are utilized to run the load test. Moreover, the various result charts may be viewed in one or many real-time streaming analytic dashboards. In each of the charts displayed on analytic dashboard window 40, the user may change the time format or legend of the horizontal axis for reporting the testing analytics in real-time on a varying time (e.g., hour-by-hour, minute-by-minute, or second-by-second) basis.

During the playback of the test composition and while the user is monitoring/viewing the test results displayed on GUI window 40, the user may pause or stop the test. Stopping the test closes the result and unloads the running test composition from all of the load servers. On the other hand, pausing or temporarily halting the test stops the load from all of the load servers, but keeps the test composition loaded and ready to resume playing into the same result. For instance, the user may pause the test after identifying a problem that requires adjustment of the load balancer on the target website. It should be understood that when the test is temporarily halted in this manner, the grid remains fully provisioned and running. In other words, the composition and running of the load test is independent from the provisioning and running of the grid. After any adjustments or reconfiguration of the target website, the user may continue with the execution or playback of the test composition, either beginning at the place where it was halted, or re-starting the test from the beginning. Persons of skill in the art will appreciate that the ability to start/re-start the test without affecting the state of the grid, in conjunction with the ability to view test results metrics in real-time (e.g., second-by-second) provides a powerful advantage over prior art methods for testing a customer website.

Figure 5:
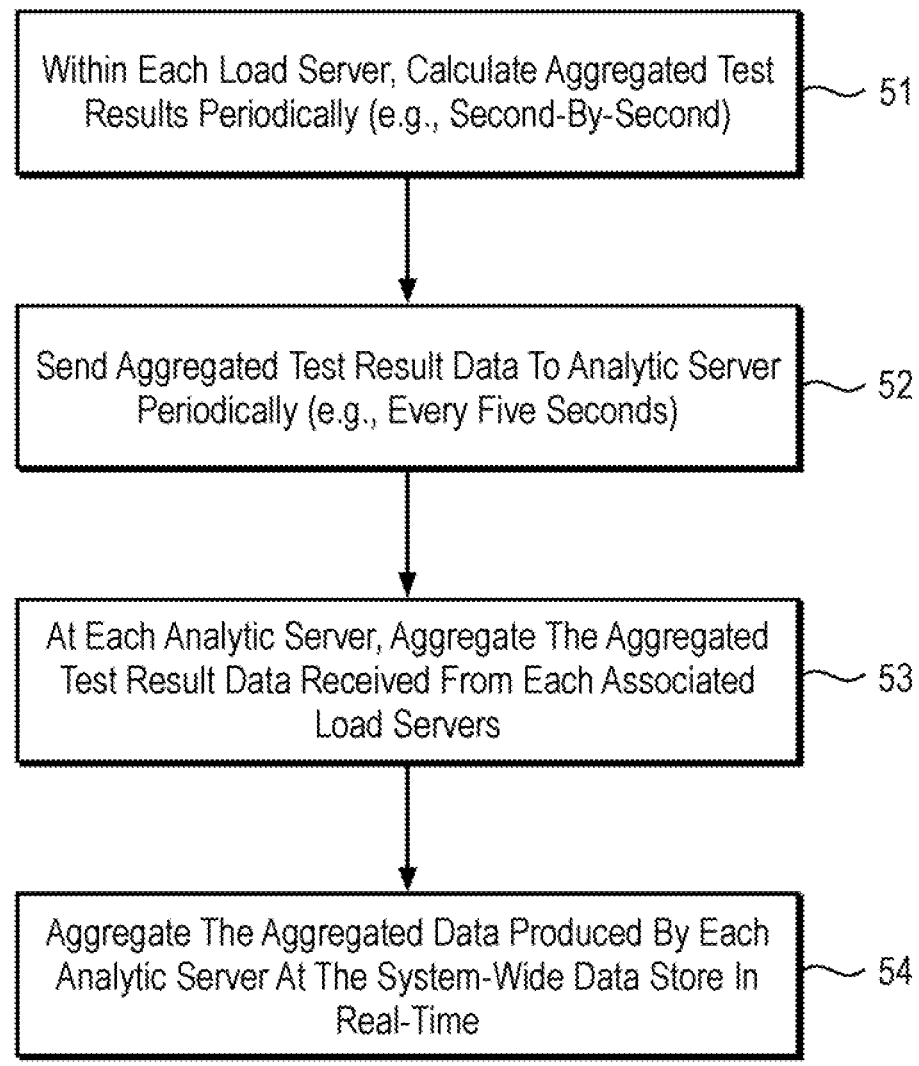
FIG. 5 is an example flow diagram of an automated sequence of steps for aggregating load test results at multiple different tiers or levels.

FIG. 5 is an example flow diagram of an automated sequence of steps for aggregating load test results at multiple different tiers or levels. The example method begins at a point where the load test grid is up and running, and the test composition is being executed on the target website. As the load test progresses, within each load server, a component or client periodically calculates or computes aggregated test results from the raw load test data generated from the target website (block 51). The raw data may comprise HTTP, Simple Object Access Protocol (SOAP) or other protocols messages' responses received from the target website, whereas the aggregated test results may comprise any statistic or metric of interest. The periodic interval that the aggregated test results are computed for may vary, but in a specific embodiment, results are computed every second.

The aggregated test results computed by the client running on each load server are periodically sent to their associated analytic server (block 52). The period at which the aggregated results are sent to the analytic servers may be equal to or greater than the period at which the aggregated test results are computed within each load server. In a typical implementation, aggregated test result data is computed by each load server every second, with the results of those computations being sent to the analytic servers from each of the load servers every five seconds.

Next, at each analytic server the aggregated test result data received from each of the associated load servers is further aggregated (block 53). In other words, each analytic server produces aggregated test result data across all of its associated load servers. For example, if each analytic server is associated (i.e., connected) with 50 load servers, each analytic server aggregates statistics/metrics across the aggregated test result data received from each of the 50 load servers.

Finally, at block 54, the aggregated statistical data produced by each analytic server is further aggregated at the system-wide data store in real-time. For instance, Structured Query Language (SQL) queries to the database can perform statistical functions (e.g., AVG, SUM, etc.) against tables' rows which have been inserted from the individual analytics servers, thereby producing further (third-level) aggregated results. As explained above, the results of this final level of aggregation is available in real-time to a browser executing an analytic dashboard that provides a graphical display of the results in various charts.

Figure 6:
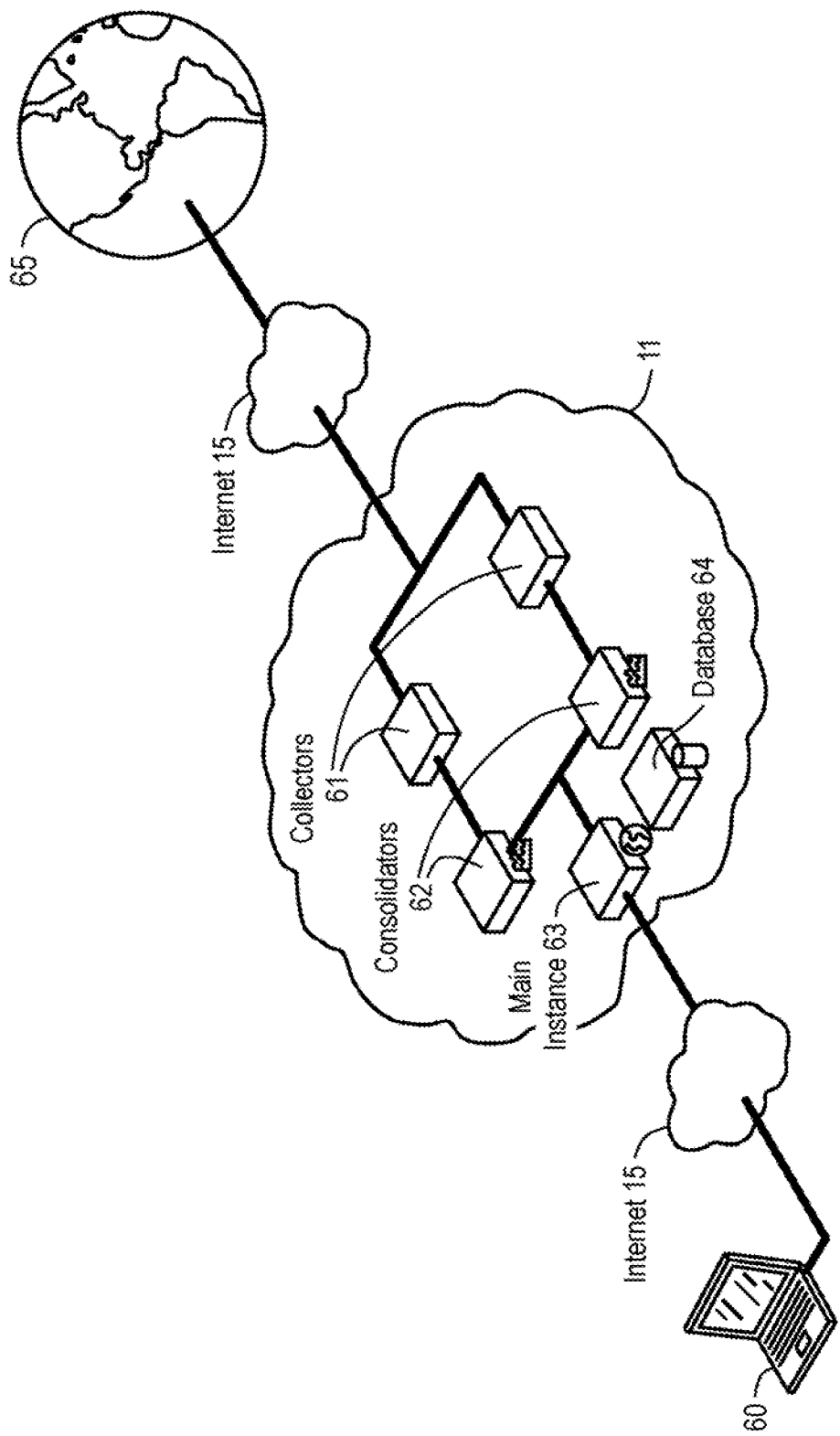
FIG. 6 is an example high level architectural diagram of one stage of a provisioning process for performing real-user measurements on a website or web application.

FIG. 6 is an example high level architectural diagram of one stage of a provisioning process for performing real-user measurements on a website or web application. The provisioning process is similar to that described in FIG. 1, except that instead of provisioning a test grid for load testing of a target website, FIG. 6 illustrates the provisioning of collectors 61 that capture data metrics from actual users around the world, represented by globe 65, who are presently visiting a website, or using a web application or a mobile app. Collectors 61 receive and terminate beacon data received from user client devices, process the beacon data, which data is then further aggregated by consolidators 62, with the final level of aggregated data being stored in a database 64, which is coupled to a main instance 63. Main instance 63 may execute the computer program that deploys the Real User Measurement (RUM) grid, which comprises a hierarchical configuration of collector and consolidator servers, as well as controlling the capture and consolidation of RUM data. Main instance may also execute code for performing real-time analytics on the captured and aggregated data, and for generating an analytic dashboard for display on a computing device 60, e.g., a user laptop computer.

Figure 7:
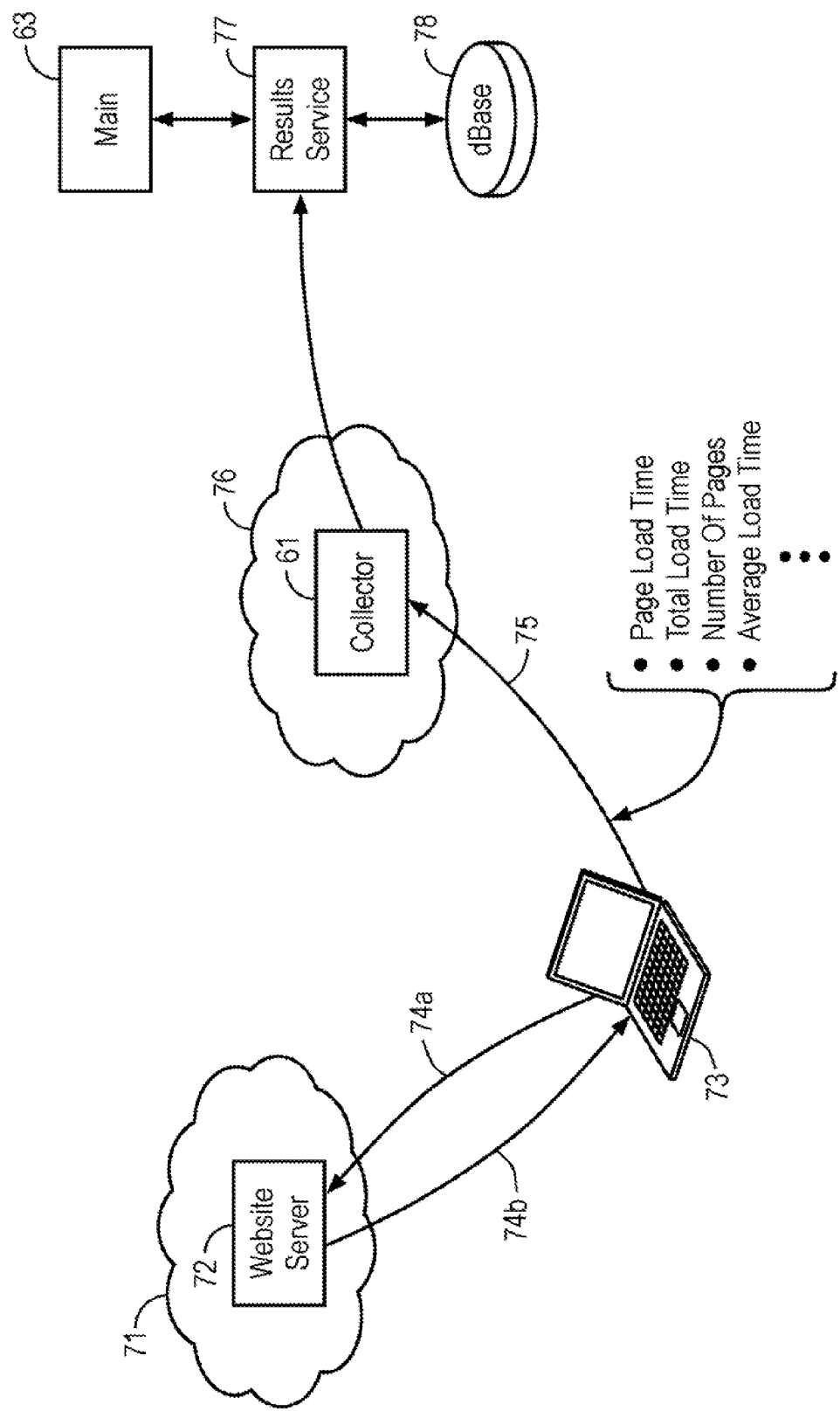
FIG. 7 is an example architectural diagram illustrating a computing platform that captures performance metrics from real user measurements in accordance with one embodiment.

FIG. 7 is an example architectural diagram illustrating a computing platform that captures performance metrics from real user measurements in accordance with one embodiment. In the embodiment shown, a user's client device (e.g., laptop computer) 73 is shown accessing a website hosted on a server 72 in network cloud 71 via messaging/communication link 74a. In response to visiting the website, host server 72 downloads the library to computing device 13 via link 74b. The library is then embedded in the browser running on client device 73. Thereafter, the library collects various metrics and data generated from the user's experience on the particular website, and periodically sends that information, as shown by arrow 75, to a results server (RS Client) or collector 61 located in network cloud 76.

The information collected and periodically sent to server 61 may include such metrics as web page load time, total load time, number of web pages accessed, average load time per page, etc. The specific metrics and data collected and sent to server may vary depending on the information of interest to the business or enterprise owning the website. In addition, the periodicity or interval for sending the data collected may vary case-to-case. In one embodiment, metrics such as page load times and average load time may be sent for each page accessed by the user. In other embodiments, metrics and data collected may be beaconed to server 20 on a predetermined time interval, e.g., every 100 ms.

In one embodiment clouds 71 and 76 may comprise the same public network (i.e., the Internet). Alternatively, clouds 71 and 76 may comprise a variety of different public and/or private networks.

It is appreciated that server 61 may receive beacons containing metrics and other performance data from a multitude of different client devices, each of which may be located in a different geographic area. In other cases, server 61 may receive metrics and data from a multitude of different client devices located in the same geographic region (e.g., San Francisco or Boston). It is appreciated that a hierarchy of servers may be arranged to collect and consolidate data and metrics received from millions, or even billions, of client devices accessing the same website or web application at the same time. All of this data is sent to a ResultsService reader/writer unit 77 that aggregates the total data received and stores it in a database 78, making it accessible to a main computer instance 63, which implements a real-time analytic dashboard for real-time visual presentation of the RUM results stored in database 78. It is appreciated that in other embodiments the aggregating unit may comprise another server, or other computing device.

Figure 8:
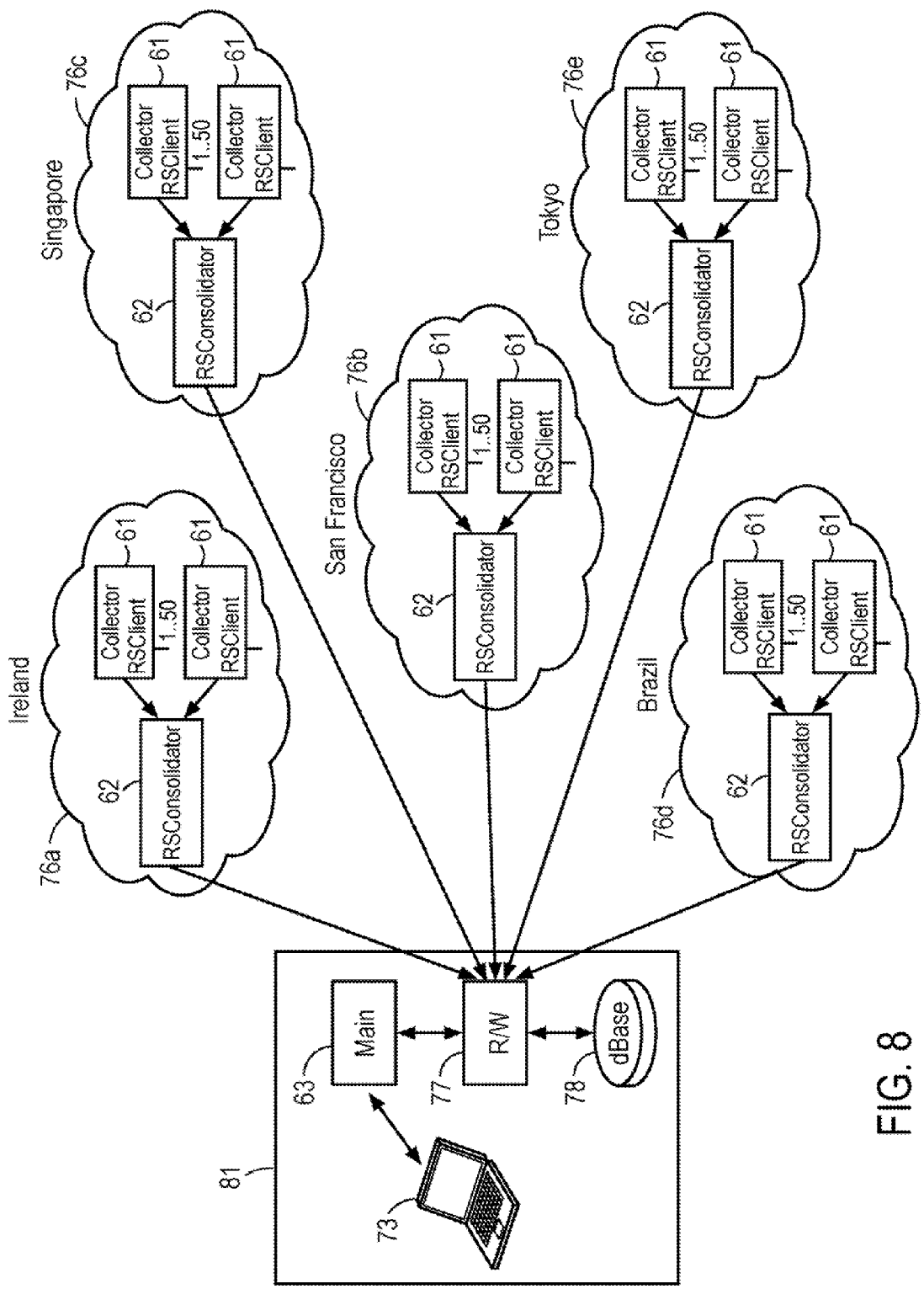
FIG. 8 is an architectural diagram illustrating an example multi-tiered grid for collecting and consolidating RUMs across the globe in real-time.

FIG. 8 is an architectural diagram illustrating an example multi-tiered grid for collecting and consolidating RUMs across the globe in real-time. Various geographically-distributed clouds 76a-76e are shown associated with Ireland, San Francisco, Singapore, Brazil and Tokyo, respectively. Each cloud 76 is shown including collectors 61, also referred to a s ResultService Client servers. In this example, up to fifty collectors 61 are shown in each cloud 76. Each collector 61 may receive beacon data from thousands of actual users presently visiting a website or using a web application. Each collector aggregates RUM data and aggregates various performance metrics in real-time from the beacons, which terminate at each collector 61.

The plurality of collectors 61 in each cloud 76 periodically (e.g., every 1-5 seconds) send their aggregated data to a result server/consolidator 62 that further aggregates the aggregated RUM performance data and metrics. Each consolidator 62 forwards the consolidated data aggregated from the collectors 62 to a ResultsService reader/writer (R/W for short) unit 77, which stores the aggregated data in database 78, where it is available to main instance 63. As described previously, main instance 63 may execute a program that generates a real-time analytic dashboard that provides the aggregated data and performance metrics in a graphical display of a computer 73, with the dashboard display changing as it is updated in real-time.

In one embodiment, main instance 63, R/W unit 77, database 78 and computer 73 may be associated or located with an enterprise 81. It other embodiments, not all of the elements and apparatus shown in box 81 may be co-located or associated with a single entity or service. For example, laptop computer 73 may be associated with a business client that contracts with a RUM data analysis service, which comprises main instance 63, R/W unit 77, database 78 and which deploys the measurement grid comprising collectors 61 and consolidators 62.

Figure 9:
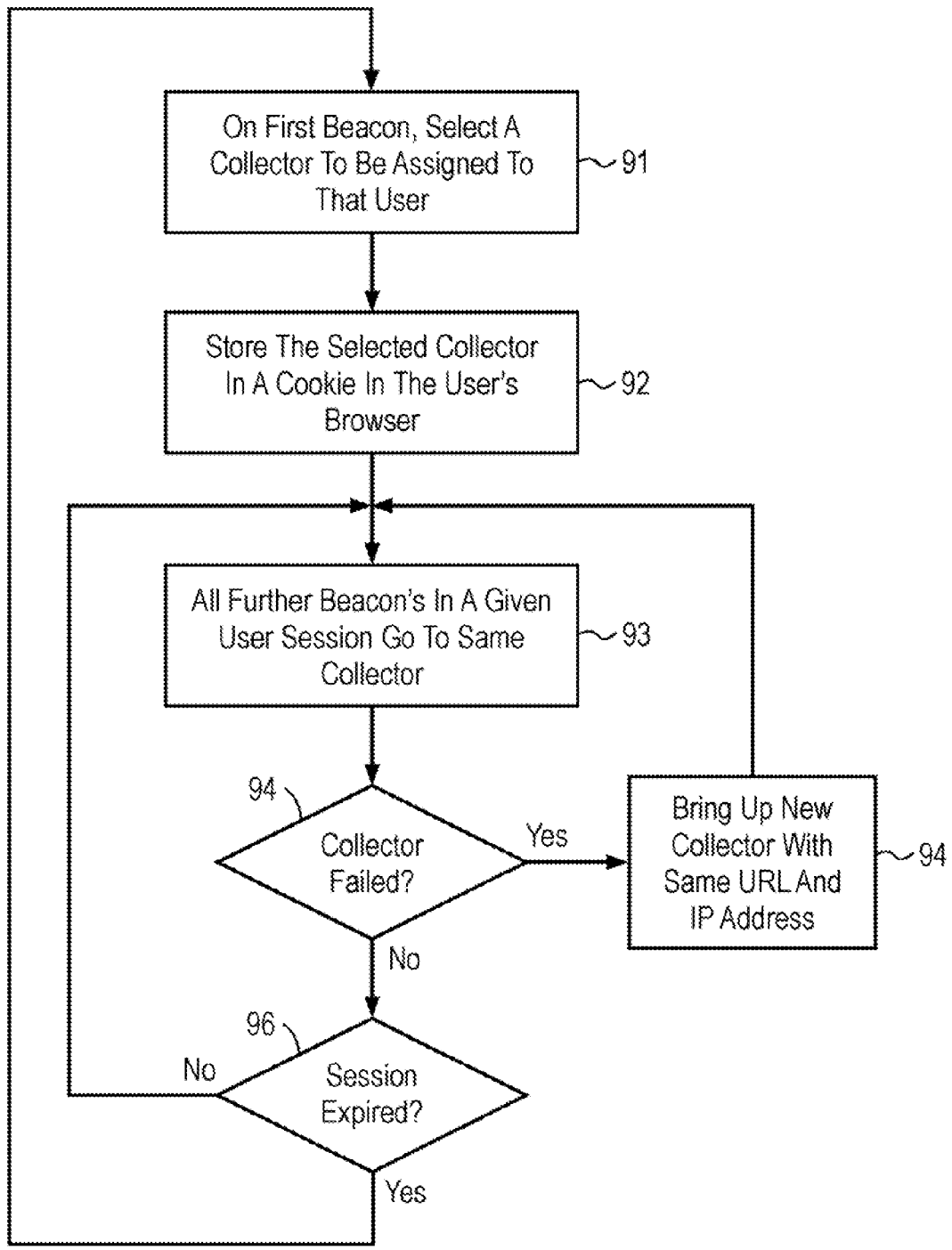
FIG. 9 is a flow diagram showing an example method for handling user sessions on a given website or web application.

FIG. 9 is a flow diagram showing an example method for handling user sessions on a given website or web application. The process begins at block 91 with the selection of a single collector that is assigned to a user once that user starts a session. In other words, the first time a beacon is generated during a user session a collector is assigned to that user session. Usually, the collector assigned to a particular user is physically located in the same geographical region as the user, e.g., San Francisco Bay Area. On the user-side, the selected collector's URL is then stored in a cookie in the user's browser running on the client device. (Block 92) This insures that the same collector is used to terminate beacons received from the user throughout the session. Stated differently, this insures that all of the beacon data generated from a single user session gets sent from the user's browser to the same collector. (Block 93)

At decision block 94 a query is made to determine whether the collector (server) has failed. If so, a new collector is brought up with the same URL and IP address as the failed collector. (Block 94) If the collector is running correctly, a second query is made to determine whether the user session has expired. (Block 96) If not, the process returns to block 93, with all further beacons being sent to and terminated at the same collector. On the other hand, if the user session expires (e.g., after a long period of inactivity) the process returns to block 91. In this manner, every single user session gets associated with a single collector through the duration of that session, which facilitates efficient processing of the beacon data.

FIG. 10 is a table showing various data and performance metrics collected from an example user session. The information shown in FIG. 10 is collected using a set or array of data buckets, the details of which are described below. As shown, the user session data of interest in this example includes the number of pages in the session, the load time for each page, total load time (cumulative) for the session, total time spent during the session (per page), one or more custom metrics, and the average page load time, which is calculated over the duration of the session. By way of example, the custom metrics may include a count of the number of items placed in a user's shopping cart during a website session. In one embodiment, each of the data items/metrics shown in FIG. 10 may be stored in a set of data buckets.

Figure 11:
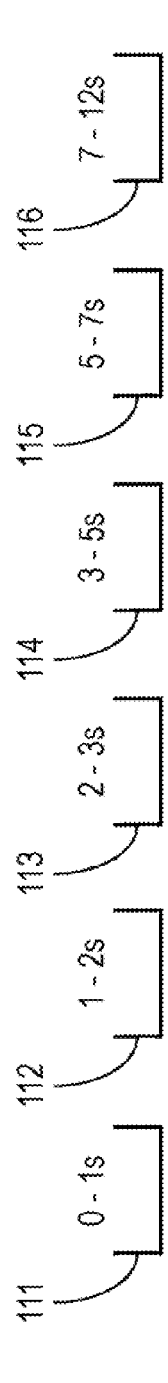
FIG. 11 is an example user session illustrating a data bucketing technique where the session object of interest is average page load time.

FIG. 11 is a chart of an example user session illustrating a data bucketing technique where the session object of interest is average page load time. In this example, a set of six data buckets 111-116 are used to collect and aggregate load time data for the user session shown in FIG. 10, which comprises five beacons, B1-B5, one for each page loaded/viewed by a user of the website. Each of the rows B1-B5 represents the state of the data buckets at a given point in time, i.e., when the beacons is sent from the client device's browser, which, for example, may occur each time the user views a new webpage. Each of the data buckets represents a separate, distinct memory resource allocated to a particular data value range. For instance, each data bucket may comprise a distinct physical memory address of a RAM, EPROM, EEPROM, or disk memory storage location (e.g., optical or magnetic).

In one embodiment, each data bucket comprises one or more accumulators, buffers, memory locations, counters, or other storage device (implemented in hardware or software) that may be incremented for each data value falling within its determined range. The data buckets collect the data items associated with each beacon received, which in this example corresponds to a new page view on the website. In accordance with one embodiment, each collector and consolidator (see e.g., FIG. 8) has an identical set or array of data buckets, with each bucket having a predefined data value range. For instance, bucket 111 is designated for average load times in the range between 0-1 s; bucket 112 is for load times greater than 1 s, up and equal to 2 s; bucket 113 is for data points greater than 2 s, up to and including load times of 3 s; bucket 114 is for load times greater than 3 s, up and equal to 5 s; bucket 115 is for data points greater than 5 s, up to and including load times of 7 s; and bucket 116 is for data points greater than 7 s, up to and including load times of 12 s. In another embodiment, the range may include the lower bound and extend up to, but not include, the upper bound.

As shown in FIG. 11, the first beacon (B1) includes a load time for the first page of 3 s, so the set of data items of interest that are associated with that load time are stored in data bucket 113. Thus, the chart shows the first page, total time spent=30 s and custom metric (e.g., items in shopping cart)=0 in bucket 113. It is appreciated that any number of additional data items of interest may also be stored in bucket 113 in response to receiving the first and subsequent beacons.

The second beacon (B2) for the second page of the user session has a load time of 1 s, making the average total load time 2 s (=(3 s+1 s)/2), which falls in the range of data bucket 112. In accordance with one embodiment, the data in bucket 113 is decremented to zero out the data items in that bucket, and the page count, total session time, shopping cart, etc., values are incremented to reflect the current data counts after the second beacon for the user session is received at the selected collector. The same process is repeated for beacons B3, B4 and B5. For instance, the average load time after the third and fourth pages have been loaded is 2 s and 1.875 s, respectively. Because both of these load time values fall within the range of data bucket 112, the chart reflects the accumulated data items in the chart entries under bucket 112. After the fifth page has loaded, the average load time for the session is now 2.3 s (=(3+1+2+1.5+4)/5), which falls within the range of bucket 113.

Continuing with the example of FIG. 11, the session items stored after the fifth beacon includes five pages loaded, the total time spent by the user now totals 170 s, and three items in the shopping cart, with an average load time of 2.3 s. This data information is stored in or associated with data bucket 113 in the set or array of data buckets of the collector receiving the beacon data for this particular user session. It is appreciated that RUM data for millions of real users may be collected in this manner in the architectures shown in FIGS. 7 & 8, with the data collected and aggregated in the result server hierarchy being forwarded/aggregated down to the final, bottom level where it is stored in a database. At each level in the hierarchy, the collector and consolidator servers include an identical set or array of data buckets that are used to aggregate and store the data and performance metrics for all of the actual website visitors or web application users in real-time. For example, using the techniques described above, an average or median load time can be calculated and continuously updated in real-time for tens or hundreds of millions of actual users.

At some point in time (e.g., every 1-10 seconds) the aggregated session data in each of the collectors is sent or "pushed" onto an associated consolidator server. This involves sending the data for the array of buckets over a network to a consolidator configured with an identical number of data buckets each having the same corresponding data range values. In other words, for the example of FIG. 11, the consolidator receiving session data from each of the collectors is configured with a set of six data buckets, each having the data value (load time) ranges shown at the top of FIG. 11. In one embodiment, a snapshot of the state of the data buckets for each session is sent from the collectors to an associated consolidator server. The state of all of the buckets in the set is based on all the sessions collected and aggregated in the consolidators. In other words, the aggregated data collected in the in the sets of data buckets for all of the collector servers for all on-going sessions is periodically sent to an associated consolidator, which aggregates all of that data in an identically configured set of data buckets.

Practitioners in the art will appreciate that no matter how many beacons a particular collector receives, only data from a finite number of data buckets, representing aggregated data for all sessions, is sent to a consolidator. The beacons themselves terminate at a particular collector, with the beacon data being placed in a set of data buckets, which is then periodically sent to a consolidator. In one embodiment, a set of 125 data buckets is used to aggregate a million or more actual user session or more for a single website. It is appreciated that each collector may be configured to handle multiple websites, each having a large multitude of user sessions. All of the millions of user sessions happening in real-time, with each session lasting from one to 10, 20 or any number of pages, fit into the set of 125 data buckets.

As described above, in one embodiment the consolidators combine the data buckets for all of the various associated collectors by aggregating (adding) counts of data metrics within each of the data buckets, e.g., how many web pages, on average, does a user view when they visit a particular website. The same process occurs down the hierarchy with the counts in each of the data buckets of the consolidators being aggregated in a final set of data buckets stored in a database. The count data in the data buckets stored in the database is updated periodically (e.g., every second) and is accessible to an main instance or other computing device which generates an analytic dashboard that graphically displays the RUM data and conversion metrics (sums, averages, medians, percentiles, etc.) on one or more user interface widgets.

To summarize, all of the beacons generated from real user sessions on a website or web application are terminated at the collectors. From there, the data is placed in data buckets arranged in sets or arrays that are uniform in number, with each bucket having a predefined value range. The data values aggregated in the data buckets are periodically sent over a network from each collector to an associated consolidator. Each consolidator has its own identical set or array of data buckets (same as the collectors) that is used to further accumulate/aggregate the data results. The aggregated data in the set or array of data buckets of each consolidator periodically (e.g., every second) sends that data to a R/W unit, which stores that data in a database. Note that the R/W unit also has a set or array of data buckets that is identical to that of the consolidators and collectors. In one embodiment, the R/W unit may expand the data in the database, according to a template, into a larger set of data that is also stored in the database. The resulting data in the database may then be read out to an analytic dashboard.

In one embodiment, template expansion provides interesting and useful insights and dimensions to the aggregated data results. For example, a business or enterprise might be interested to know how real users' experience on their website varies across different geographical regions, browser types, and other metrics.

FIG. 12 shows an example list 120 of selected metrics that may be of interest for template expansion. As shown, list 120 includes the metrics of geography (e.g., continent or region of the globe), country and region, browser type, operating system (O/S), page group, Alpha/Beta release version of a website, bandwidth, and customer defined metrics. Even though list 120 is shown including seven metrics, it is appreciated that all of the various combinations of these metrics can produce an extremely large matrix of data. For instance, there are 250 countries around the world, each with up to 100 different regions; there are 170 different browsers; 10-15 different operating systems, and so on.

To reduce the number of combinations down to a manageable number, the potential number of possible combinations, in one embodiment a limited subset of combinations of importance or interest is defined. By way of example, FIG. 12 illustrates a subset 121 of such combinations that includes country, page group, country and page group, country and browser, and country and region (if the country is the USA). In other embodiments different combinations may be selected or defined to be of interest to a particular business or enterprise. For instance, a company that only does business in France may opt for a different set of combinations.

In one embodiment, a limited subset of combinations is applied during the collection/aggregation process to achieve meaningful template expansion. To better understand this process, consider the example shown in FIG. 13, where subset 121 is used during collection of data received during a user session. In this example, the first beacon (B1) generated during the user session arrives at a collector from a user located in California, who is running Chrome browser, and who is currently visiting the home page of a website. Applying subset 121 of important combinations shown in FIG. 12, this single beacon expands or maps into four different data buckets: the USA template expansion, the USA+California template expansion, the Home page template expansion and the USA+Chrome browser template expansion.

Practitioners in the art will understand that using the template expansion approach described above separate sets or arrays of data buckets are created for each type of template expansion based on a predefined subset of combinations of metrics. For the example of FIG. 13, this expansion results in an entire set of load time data buckets for the whole website, another set for USA, a third set for USA+CA, a fourth set for USA+MA, a fifth set for USA+Chrome, a sixth set for USA+Internet Explorer, and a seventh set for Home page.

FIG. 13 also shows a second beacon (B2) mapping into four different data buckets, which includes the USA and Home expansions created from B1, and two new expansions: the USA+Massachusetts template expansion and the USA+Internet Explorer template expansion. Note that after the second beacon is received, six different sets of data buckets (each identical in number and individual data value ranges) are now in use. Continuing with this example, a third beacon (not shown) might result in another new template expansion, and so on. It is appreciated, however, that after a million or more beacons have arrived at the collector the number of template expansions typically remains small (e.g., 6-10) due to the limited number of combinations defined by subset 121. That is, the mapping of a beacon onto subset 121 is substantially smaller than would be the case if the expansion accounted for every possible combination of different metrics represented in list 120.

Figure 14:
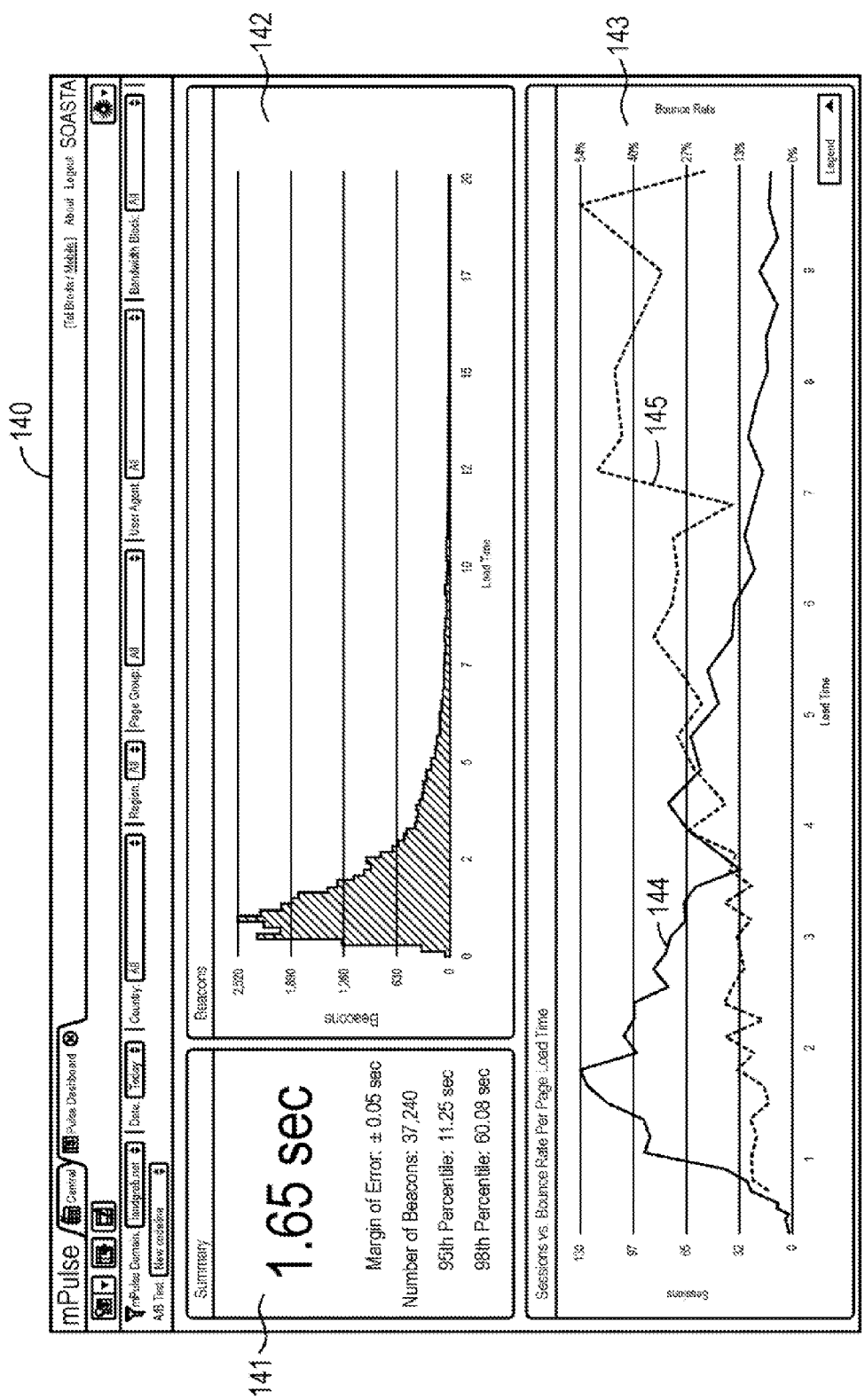
FIG. 14 is an example analytic platform dashboard window that delivers real-time visual information from RUM data.

FIG. 14 illustrates a mPulse™ data analysis platform dashboard window 140 that delivers real-time visual information from RUM data captured, collected and aggregated in accordance with the embodiments described above. As shown, a number of visual indicators representative of the aggregated contained in the set or array of data buckets of the R/W unit (or the expanded data sets stored in the database) is displayed in window 140. This visual information includes a summary field or widget 141 that displays a median web page load time presently being experienced by real users calculated from 37,240 total beacons. Other statistical information, such as margin of error, 95th percentile load time, and 98th percentile load time, is also included in summary widget 141.

Window 140 also includes a beacon histogram widget 142 which comprises a number of histogram bars (adjacent bars being merged), with each bar representing a count of the number of beacons received for the whole website which fall into a particular data bucket having a predetermined value range. For example, in ascending order the first data bucket in the set or array may have a value range $R_1 = 0 \text{ s} < V \leq 100 \text{ ms}$ (where V is the value of a given data item of a beacon); the second data bucket in the set or array may have a value range $R_2 = 100 \text{ s} < V \leq 200 \text{ ms}$; the third data bucket may have a value range $R_3 = 200 \text{ s} < V \leq 400 \text{ ms}$; and so on.

The example dashboard window 140 shown in FIG. 14 further includes a widget 143 which charts the number of user sessions as a function of page load time (solid line 144) versus the bounce rate for the website per page load time (dashed line 145). The bounce rate is a performance metric that represents a ratio or percentage of visits to a website that only involve one web page (e.g., a home page) with the user leaving without viewing a different web page, versus those visitors who actually view multiple pages. For example, if in a given time period there are 100 visits to the website and 10 of those visitors immediately left without visiting another page, the bounce rate would be 10%. As shown, the bounce rate in this example is strongly correlated to the page load time of the website.

Figure 15:
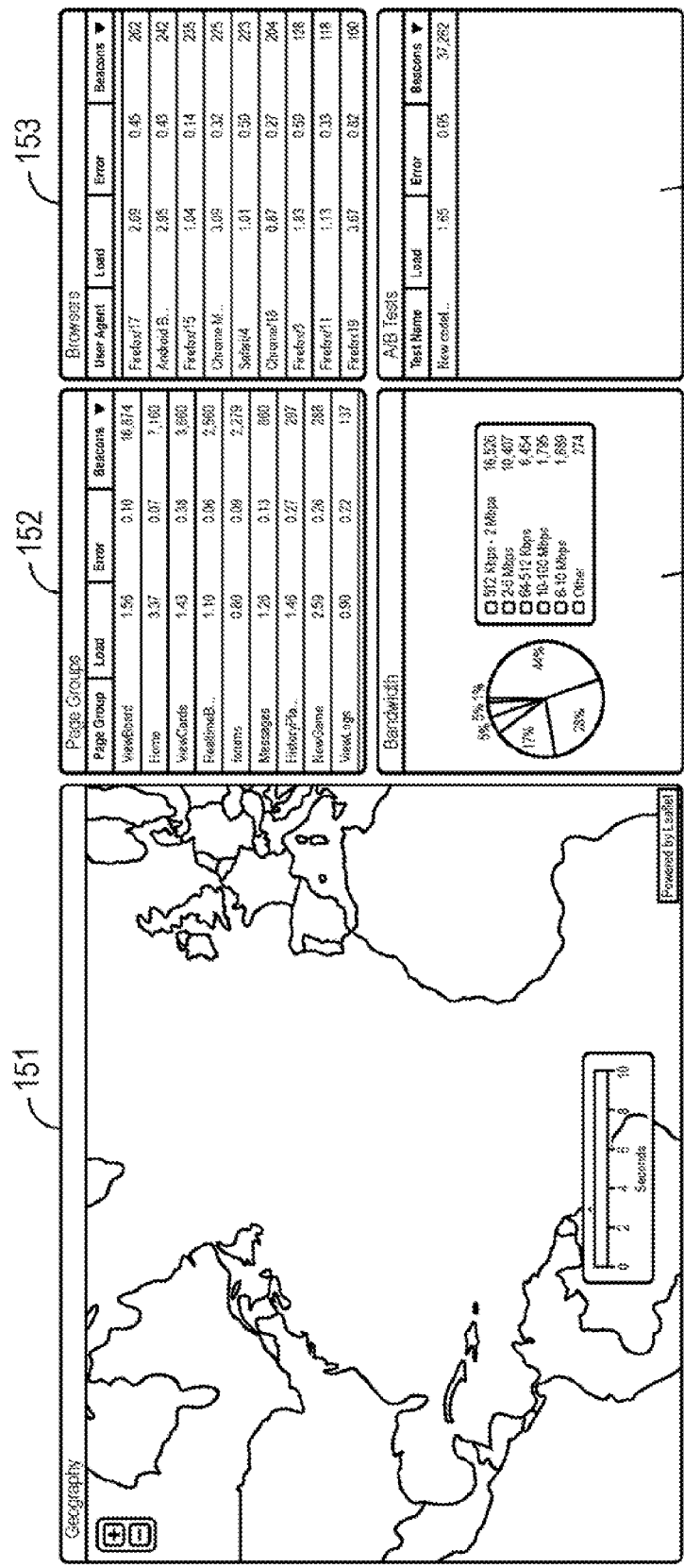
FIG. 15 is an example group of additional fields or widgets that may be incorporated into or displayed on an analytic dashboard window.

FIG. 15 is an example group 150 of additional fields or widgets that may be incorporated into or displayed on the analytic dashboard window 140 of FIG. 14. Group 150 shown includes a geography widget 151 that allows a user to position a cursor ("mouse-over") a geographical region, which user action automatically causes a window to open over that region showing relevant real-time performance metric data results based on RUM of actual users presently visiting a particular website, e.g., median load time in the USA. Also included is a Page Groups widget 152 which lists load time and other statistical information for various page groups of the website, a browser type field or widget 153 which provides similar information per browser type, a bandwidth widget 154, and an Alpha/Beta versions field or widget 155. In one embodiment the user may configure or select the number and type of widgets or fields to be displayed on the analytics dashboard at any given time.

Figure 16:
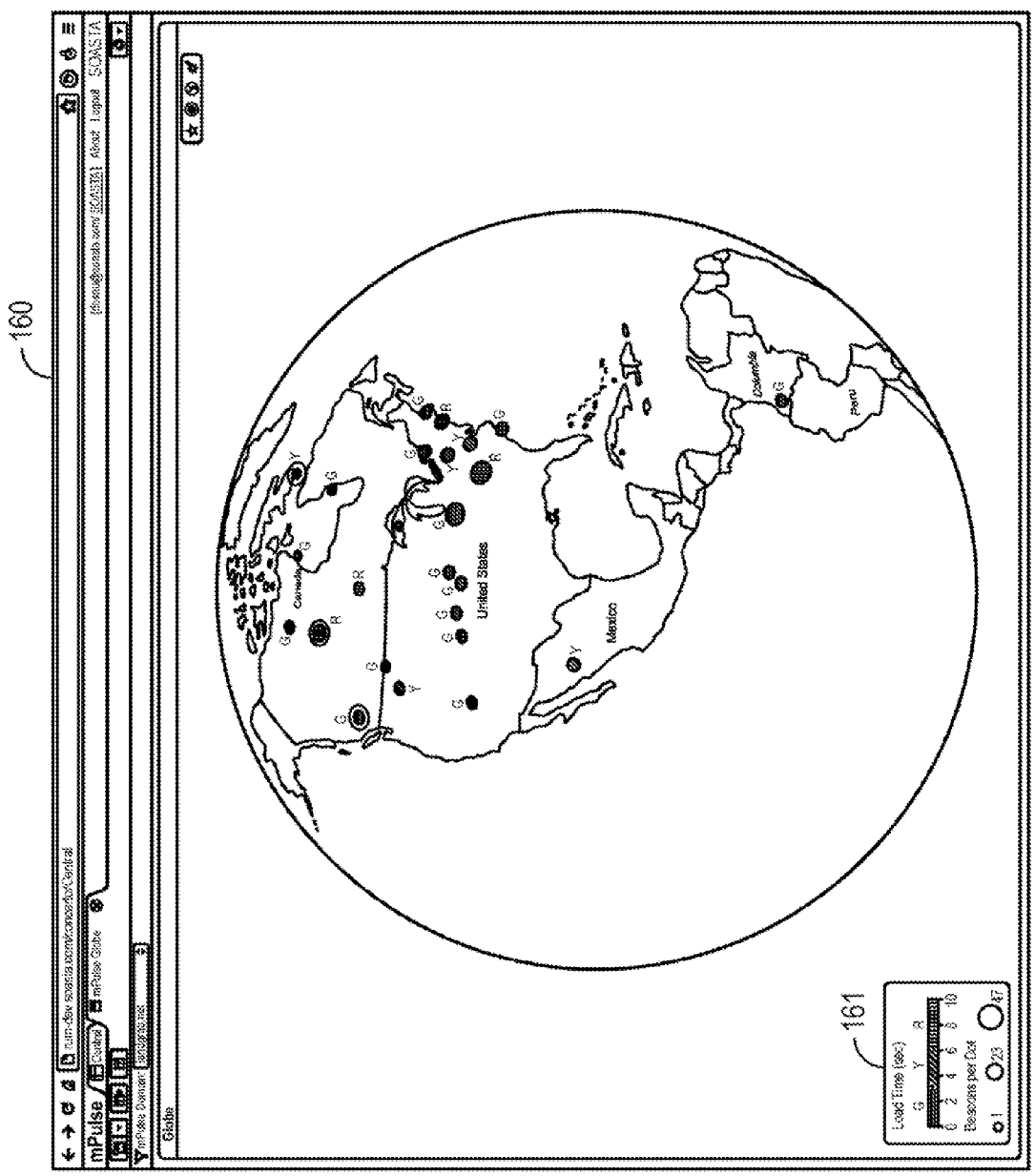
FIG. 16 is an example analytic dashboard window that shows the world from outer space while providing real-time visual information from RUM data.
Figure 17:
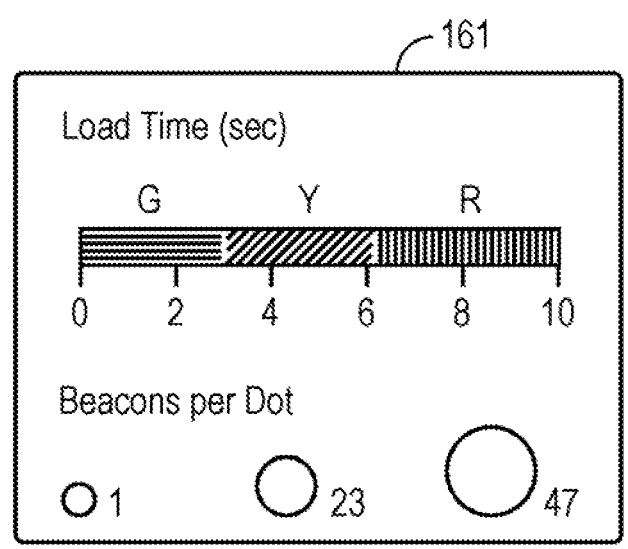
FIG. 17 illustrates details of the key shown in FIG. 16 for deciphering the various RUM data beacons.

FIG. 16 is an example analytic dashboard window 160 that shows a three-dimensional (3D) image of the world from outer space while providing real-time visual information from RUM data. As shown, the dashboard window 160 real-time visualizations of RUM data is depicted in the form of circular-shaped beacon dots that periodically flash or appear (similar to a lighthouse beacon) on the display screen. In this example, a set of beacon dots depicting real user measurements of a particular website are shown over North America and a portion of South America. As shown, each beacon comprises a circular-shaped dot, the visual attributes including a size of the circular-shaped dot, the size representing a total number of real users at the geographic location. That is, each dot represents aggregated data obtained from real users in real-time, with the size and color of the dot providing information about the number of users at a particular geographic location and a computed performance metric (e.g., average or median load time). For instance, key 161 shown in the lower, left-hand corner of window 160 indicates the number of beacons per size of each dot, and also the web page load time in seconds as indicated by the color of the beacon dot. A larger view of key 161 is shown in FIG. 17.

Continuing with the example of FIG. 16, beacon dots shown in green indicate a RUM load time of less than 3 seconds at a particular geographic location. Yellow beacon dots indicate load time responses in a range of 3 to 6 seconds, with load time responses greater than 6 seconds being shown in red. Note that in FIG. 16 the green, yellow, and red colors are denoted by the respective letters "G", "Y", and "R" next to the associated beacon dots.

It is appreciated that analytic dashboard window 160 may be configured to allow a customer to define or select the color of the beacon dots to be representative of a variety of different metrics. For example, a business running a website may, using UI controls, set the color of the beacon dots at a particular location to represent the average number of items in real user's shopping carts, or the average total cost of items in user's shopping carts.

As discussed above, the size of the beacon dots depicts the total number of users at that geographic location. The larger the beacon dot, the more users who are accessing or using a particular website at that location. It is appreciated that the size of the beacon dots may also be scaled to capture a wide range of the number of users in the world. For instance, smaller beacon dots may be used for numbers in a range of 1-9; medium-sized beacon dots may represent user numbers in the range of 10-99; large beacon dots may represent numbers from 100-999, with very large beacon dots representing numbers of 1,000 or more real users at a location.

It should be appreciated that the RUM visualization provided in analytic dashboard window 160 is generated in real-time using the aggregation methods, apparatus and systems described previously. The worldview provided in window 160 allows a business to visualize transactions actually happening on their website in real-time on a global scale. Note that the visualization provided is dynamic, meaning that it changes in real-time as the performance metrics change, and as the number of users change across the globe. For instance, if one or more new users suddenly accessed the website under analysis from a location in southern Florida (e.g., Miami), a new colored beacon dot would appear at that location on the dashboard window. Similarly, the size and color of each beacon dot changes dynamically in response to changing performance measurements and user numbers.

In one embodiment, the dynamic nature of the beacon dots is visually indicated by having the beacon dots periodically (e.g., every 2-5 seconds) refresh or "pulse" as a colored circle with an outer ring or "ripple" effect, which dissipates or disappears. By way of example, three beacon dots located in Canada are shown in window 160 with an outer ring to visualize a periodic refresh pulse. Note that in one embodiment, all of the RUM data metrics are updated in real-time on the analytic dashboard each second. However, the visualization refresh rate may be set to occur at a different rate (e.g., every 2, 5 or 10 seconds) to provide a more pleasing visual experience to the user of the analytic dashboard.

Figure 18:
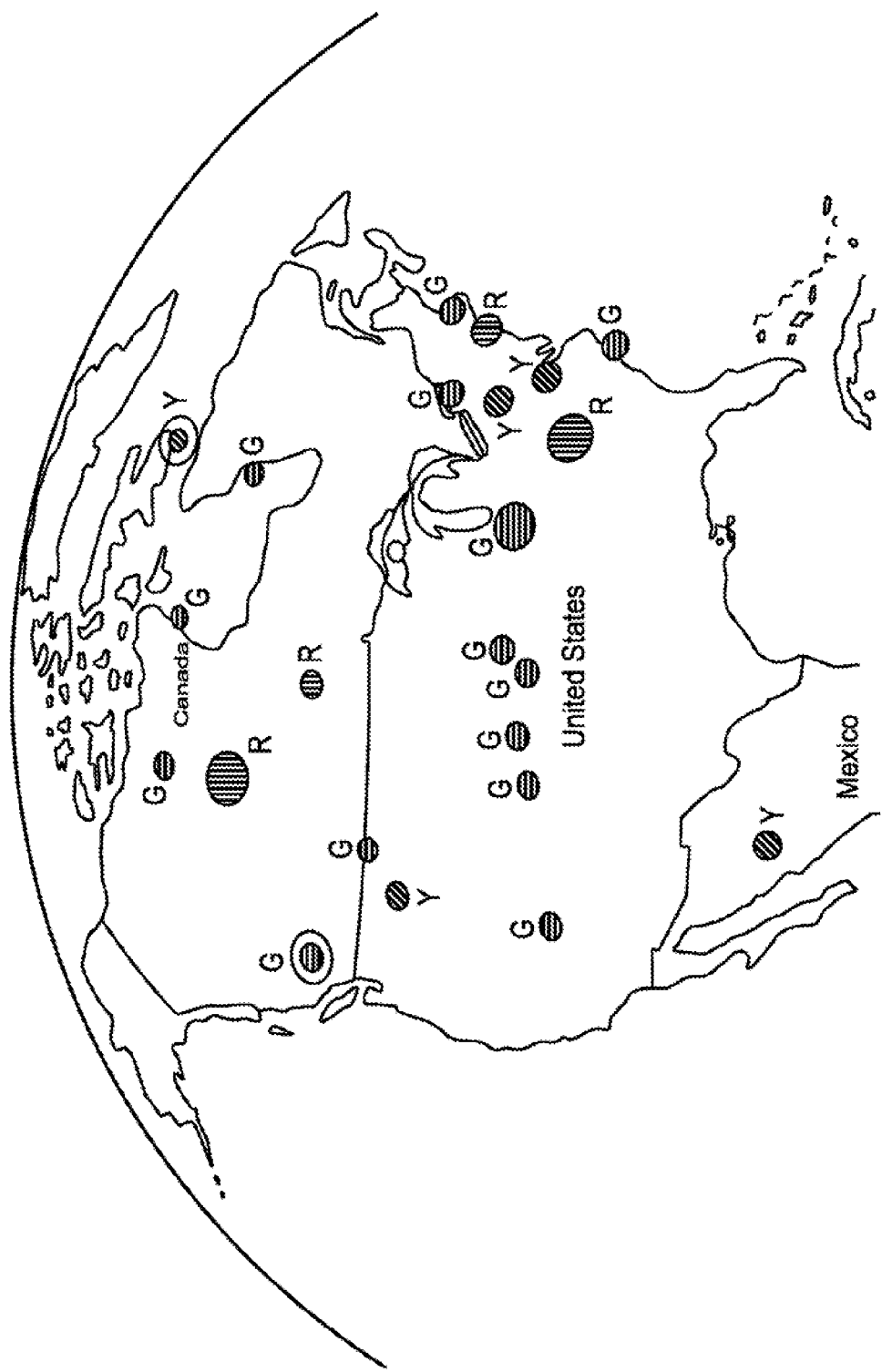
FIG. 18 is an example expanded view of a section of the Northern Hemisphere of the world centered over North America details, showing RUM data beacons.

In the embodiment shown, a user interface control is also provided to allow the user to turn or rotate the globe in any direction (e.g., up, down, sideways) to view any region of the world. Clicking and dragging on the planet allows a user of the analytic dashboard to gently spin the globe. The middle scroll wheel or right-click dragging may be used to zoom in and out for close-up views. For example, FIG. 18 is an example expanded view of a section of the Northern Hemisphere of the world centered over North America details, showing RUM data beacons. The expanded view may be used to visually provide more details and finer granularity data.

In yet another embodiment, the user interface allows a user to flatten the 3D image of the globe to a two-dimensional (2D) image. A toggle command may be used to change the display image back from the 2D image to a 3D globe.

In turning or spinning the globe using the user interface, the sunlit portions of the globe may change to dark, nighttime exposure in correspondence with actual daytime/nighttime conditions around Earth. In addition, the global visualization may include actual weather (e.g., cloud) conditions around the globe. This added feature allows a business to visualize how customers and users experience and demand changes depending on time of day or weather conditions. It also allows an online merchant to shift or allocate more resources to their website (e.g., number of servers and their configuration) based on the visualized data metrics being generated.

Additionally, the 3D image of the globe may also include colors for distinguishing the different real user performance measurements in various individual countries. This means that in addition to visually displaying the aggregated beacons at specific locations (e.g., individual cities and towns) in real time, the user interface allows a user to display a statistical result of a given performance metric experienced by real users of a website over an entire country or large geographic region (e.g., Southwest USA). For example, the entire area (or boundary) of a country or region on the globe may be shaded or highlighted in a color representative of the mean aggregated value for a particular metric (e.g., web page load time) or timer. In this way, the globe may appear with individual countries, states, or regions mapped in different colors according to the mean value (or other statistical computation) of the performance metric or timer experienced by real users (in real-time) across those countries or regions.

By way of example, in one embodiment the entire area covering the 48 contiguous states of the United States of America (or just the border or boundary) may be shaded or colored green to reflect the fact that the mean load time (or other metric or timer) currently being experienced by real users in the USA is low (i.e., fast performance). At the same time, Australia may be colored or shaded red, reflective of a high mean load time (i.e., slow performance). In another embodiment, the user interface allows a business customer to switch between different performance metrics or timers with a click of a button or other input command. For instance, the color mapping of individual countries may be immediately switched from visually displaying mean load time to displaying mean time spent on the website, or mean number of items in user's shopping cart.

In other embodiments, the user interface provides the ability for a business customer or website owner to show their own data on the globe, via Keyhole Markup Language (KML) layers (e.g. points and areas). Persons of skill understand that KML is an XML notation for expressing geographic annotation and visualization within Internet-based, two-dimensional maps and three-dimensional Earth browsers. A KML file specifies a set of features (place marks, images, polygons, 3D models, textual descriptions, etc.) for display in Google Earth, Maps and Mobile, or any other geospatial software implementing the KML encoding. Each place has a longitude and latitude. Other data can make the view more specific, such as tilt, heading, altitude, which together define a "camera view" along with a timestamp or timespan. In one embodiment, business customers and website owners may display any one of a variety of timers (e.g., different page load timers or a custom timer). In still other embodiments, the user interface also allows a customer to show custom metrics (e.g., website sales revenue, conversions, etc.) directly on the 3D image of the globe.

In one embodiment, 3D graphics animation of the planet for generating window 160 is obtained in the form of a set of visual tiles available from NASA (http://eyes.nasa.gov/earth/launch2.html) which shows current camera views of the planet taken from geosynchronous satellites positioned in orbit around the globe. In one embodiment, WebGL (a JavaScript API) may be utilized to provide the interactive 3D graphics, straight into the browser, as shown in FIG. 16. Thus, the embodiment shown in FIG. 16 provides 3D graphics animation technology with actual (i.e., photorealistic) visualizations of the globe, as applied to business intelligence (BI) enterprise software.

It should be understood that elements of the disclosed subject matter may also be provided as a computer program product which may include a machine-readable medium having stored thereon instructions which may be used to program a computer (e.g., a processor or other electronic device) to perform a sequence of operations. Alternatively, the operations may be performed by a combination of hardware, firmware, and software. The machine-readable medium may include, but is not limited to, floppy diskettes, optical disks, CD-ROMs, and magneto-optical disks, ROMs, RAMs, EPROMs, EEPROMs, magnet or optical cards, or other type of machine-readable medium suitable for storing electronic instructions.

Additionally, although the present invention has been described in conjunction with specific embodiments, numerous modifications and alterations are well within the scope of the present invention. Accordingly, the specification and drawings are to be regarded in an illustrative rather than a restrictive sense.

We claim:
1. A computer-implemented method comprising:
providing on a computer, which includes a processor coupled with a memory,
a graphical user interface (GUI) that displays on a screen a view of the globe, the view including a geographic distribution of beacons having one or more visual attributes, each beacon corresponding to one or more client devices, each associated with real users who are accessing a website, web application or mobile app from a geographic location, the one or more visual attributes including an indicator of a performance metric representative of an experience of the one or more real users of the website, web application, or mobile app, each beacon being generated in real-time from one or more corresponding real user sessions on the website, web application or mobile app, the beacons being received by one or more first servers and aggregated in real-time by one or more second servers coupled with the computer over a network, the indicator including a statistical result of the performance metric computed in real-time based on the aggregated beacons;
periodically refreshing the beacons, with the one or more visual attributes changing in response to measured changes in the geographic distribution, a total number of real users at the geographic location, or the indicator at the geographic location; and wherein the GUI provides a user with an ability to change the view of the globe so as to display any geographic region of the globe responsive to user control input.

2. The computer-implemented method of claim 1 wherein the view is a 3D animated view as from outer space.

3. The computer-implemented method of claim 1 wherein the view is a flat 2D view of at least a portion of the globe.

4. The computer-implemented method of claim 1 wherein the indicator comprises a web page load time.

5. The computer-implemented method of claim 1 wherein the one or more visual attributes include a color associated with each beacon of the view.

6. The computer-implemented method of claim 1 wherein the one or more visual attributes include a circular-shaped dot associated with each beacon of the view, the circular-shaped dot having a size representing a total number of real users at the geographic location.

7. The computer-implemented method of claim 1 further comprising providing a user of the GUI with an ability to selectively expand the view of the globe responsive to user control input.

8. A non-transitory computer-readable storage medium encoded with computer instructions, which, when executed by one or more processors, operable to:

provide a graphical user interface (GUI) that displays on a screen a view of the globe, the view including a geographic distribution of beacons having one or more visual attributes, each beacon corresponding to one or more client devices, each associated with real users who are accessing a website, web application or mobile app from a geographic location, the one or more visual attributes including an indicator of a performance metric representative of an experience of the one or more real users of the website, web application, or mobile app, each beacon being generated in real-time from one or more corresponding real user sessions on the website, web application or mobile app, the beacons being received by one or more first servers and aggregated in real-time by one or more second servers, the indicator including a statistical result of the performance metric computed in real-time based on the aggregated beacons;

periodically refresh the beacons, with the one or more visual attributes changing in response to measured changes in the geographic distribution, a total number of real users at the geographic location, or the indicator at the geographic location; and wherein execution of the computer instructions is further operable to provide a user of the GUI with an ability to change the view so as to display any geographic region of the globe responsive to user control input.

9. The non-transitory computer-readable storage medium of claim 8 wherein the view is a 3D animated view as from outer space.

10. The non-transitory computer-readable storage medium of claim 8 wherein the view is a flat 2D view of at least a portion of the globe.

11. The non-transitory computer-readable storage medium of claim 8 wherein the indicator comprises a web page load time.

12. The non-transitory computer-readable storage medium of claim 8 wherein the one or more visual attributes include a color associated with each beacon of the view.

13. The non-transitory computer-readable storage medium of claim 8 wherein the one or more visual attributes include a circular shaped dot associated with each beacon of the view, the circular-shaped dot having a size representing a total number of real users at the geographic location.

14. The non-transitory computer-readable storage medium of claim 8 wherein execution of the computer instructions is further operable to provide a user of the GUI with an ability to selectively expand the view of the globe responsive to user control input.

\* \* \* \* \*